US008837294B2

(12) United States Patent
Frishberg et al.

(10) Patent No.: US 8,837,294 B2
(45) Date of Patent: *Sep. 16, 2014

(54) SCHEMATIC DISPLAY OF PROTOCOL-SPECIFIC INFORMATION

(75) Inventors: Leo Frishberg, Portland, OR (US); Eric Gould Bear, Austin, TX (US)

(73) Assignee: Tektronix, Inc., Beaverton, OR (US)

( * ) Notice: Subject to any disclaimer, the term of this patent is extended or adjusted under 35 U.S.C. 154(b) by 1804 days.

This patent is subject to a terminal disclaimer.

(21) Appl. No.: 11/740,135

(22) Filed: Apr. 25, 2007

(65) Prior Publication Data

US 2008/0144656 A1    Jun. 19, 2008

Related U.S. Application Data

(63) Continuation-in-part of application No. 11/612,639, filed on Dec. 19, 2006.

(51) Int. Cl.
H04L 12/26 (2006.01)
H04L 29/08 (2006.01)
H04L 12/24 (2006.01)

(52) U.S. Cl.
CPC .............. H04L 43/045 (2013.01); H04L 43/18 (2013.01); *H04L 41/22* (2013.01); *H04L 67/36* (2013.01)
USPC ........ 370/241; 370/241.1; 370/242; 370/244; 370/250; 370/254; 370/255; 713/25; 713/39; 713/57

(58) Field of Classification Search
None
See application file for complete search history.

(56) References Cited

U.S. PATENT DOCUMENTS

| 5,684,954 | A | | 11/1997 | Kaiserswerth et al. |
|---|---|---|---|---|
| 5,768,552 | A | * | 6/1998 | Jacoby .......................... 345/441 |
| 5,805,118 | A | * | 9/1998 | Mishra et al. ................... 345/1.1 |
| 6,034,963 | A | | 3/2000 | Minami et al. |
| 6,639,607 | B1 | | 10/2003 | Ferguson et al. |
| 6,683,993 | B1 | | 1/2004 | Mead |
| 6,708,337 | B2 | | 3/2004 | Moysan et al. |
| 6,976,080 | B1 | | 12/2005 | Krishnaswamy et al. |
| 7,379,078 | B1 | | 5/2008 | Gossweiler et al. |
| 7,386,628 | B1 | | 6/2008 | Hansell et al. |
| 2001/0015984 | A1 | | 8/2001 | Lenz et al. |
| 2001/0035971 | A1 | | 11/2001 | Koakutsu et al. |
| 2002/0085549 | A1 | | 7/2002 | Reza et al. |
| 2003/0103077 | A1 | * | 6/2003 | Despotidis et al. ........... 345/734 |
| 2003/0223423 | A1 | | 12/2003 | Yu et al. |
| 2004/0100468 | A1 | | 5/2004 | Tenten et al. |
| 2004/0109453 | A1 | | 6/2004 | Wirth |
| 2006/0268406 | A1 | | 11/2006 | McMahon et al. |
| 2007/0030812 | A1 | | 2/2007 | MacDonald et al. |
| 2008/0255784 | A1 | | 10/2008 | Gamper et al. |

OTHER PUBLICATIONS

U.S. Appl. No. 11/612,639, filed Dec. 19, 2006: "Symbolic Representation of Protocol Specific Information", Inventors: Leo Frishberg and Eric Gould Bear.

(Continued)

*Primary Examiner* — Faruk Hamza
*Assistant Examiner* — Aixa A Guadalupe Cruz
(74) *Attorney, Agent, or Firm* — Marger Johnson & McCollom, PC; Thomas F. Lenihan; Francis I. Gray

(57) ABSTRACT

A test and measurement instrument for displaying data including an acquisition system configured to receive an input signal, a processor coupled to the acquisition system and configured to generate a schematic from protocol-specific information within the input signal, and a display coupled to the processor and configured to display the schematic.

29 Claims, 19 Drawing Sheets

(56) References Cited

OTHER PUBLICATIONS

U.S. Appl. No. 11/690,800, filed Mar. 23, 2007: "Symbolic Representation of Protocol-Layer Information", Inventor: Leo Frishberg.

Understanding IP Networking—Voice over IP, a TRA publication, pp. 3-4, 3-6, and 3-8, published Mar. 17, 2000.

Webster's II, New Riverside Dictionary, copyright 1984, p. 541, showing the definition of "polygon".

* cited by examiner

FIGURE 3
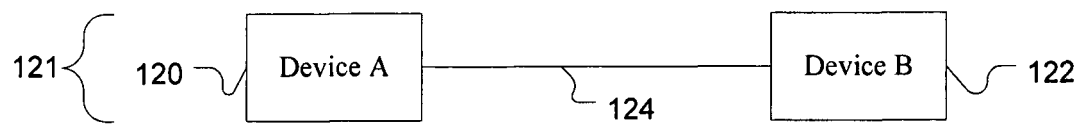
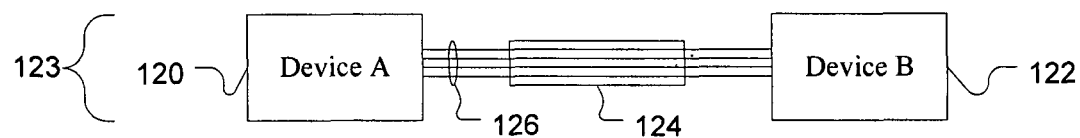
FIGURE 4
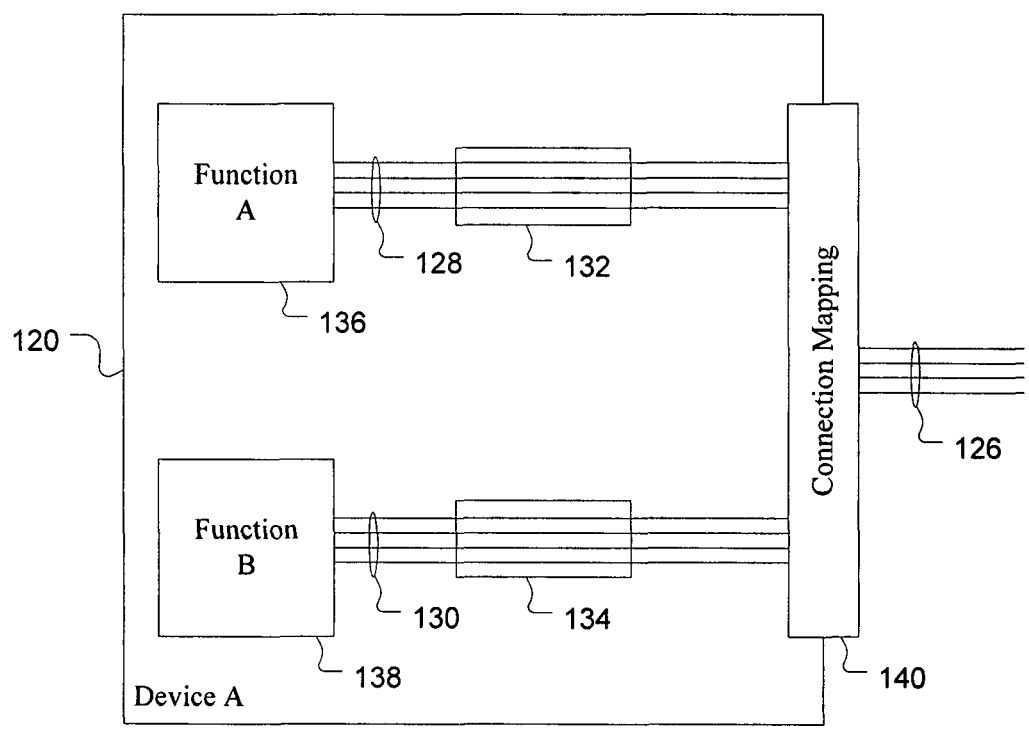

FIGURE 10
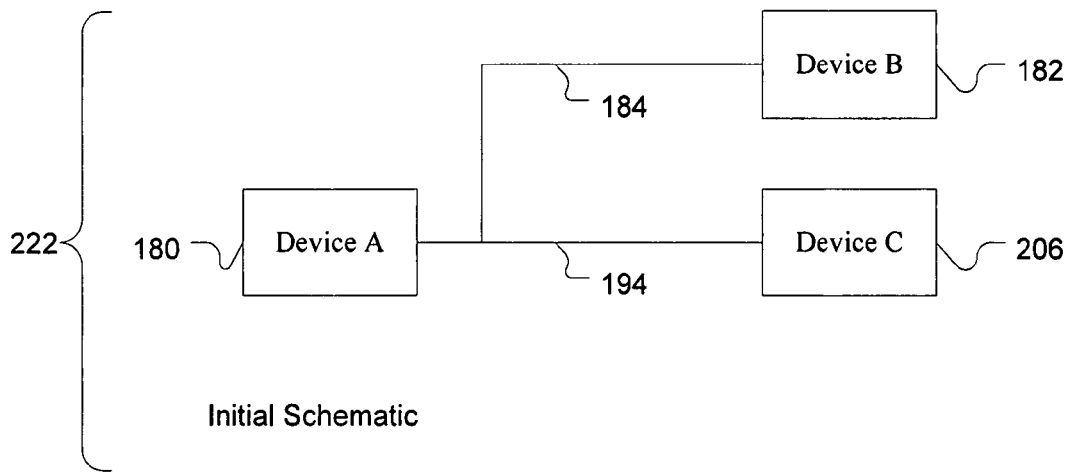
Initial Schematic
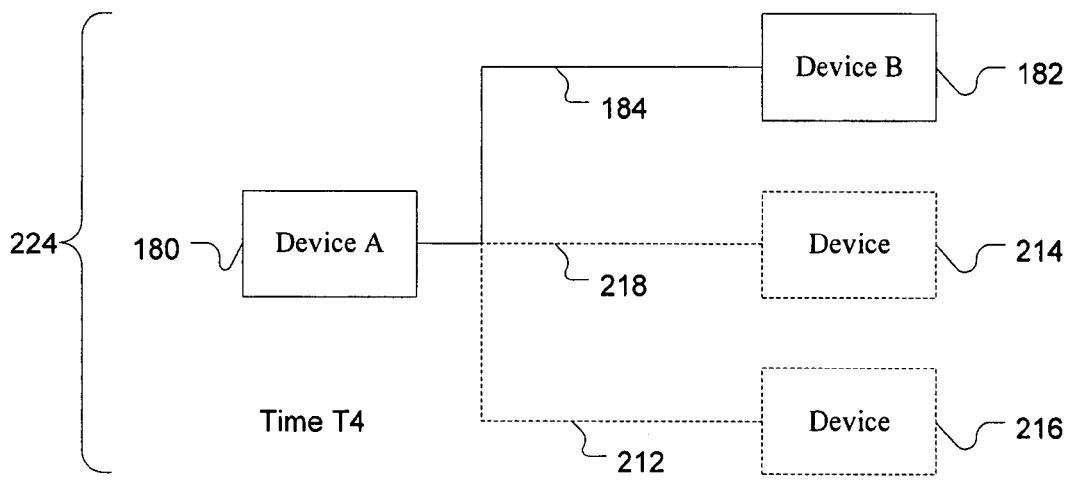
Time T4
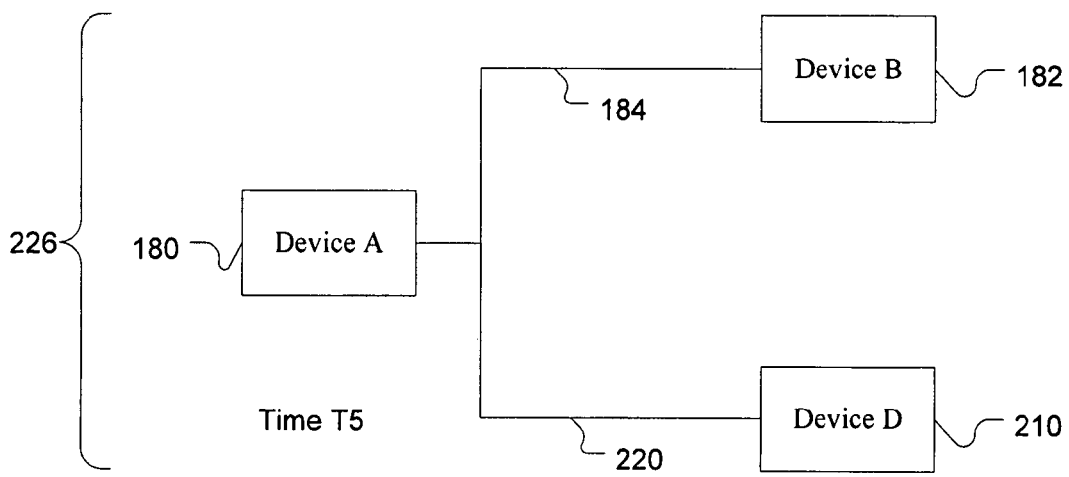
Time T5

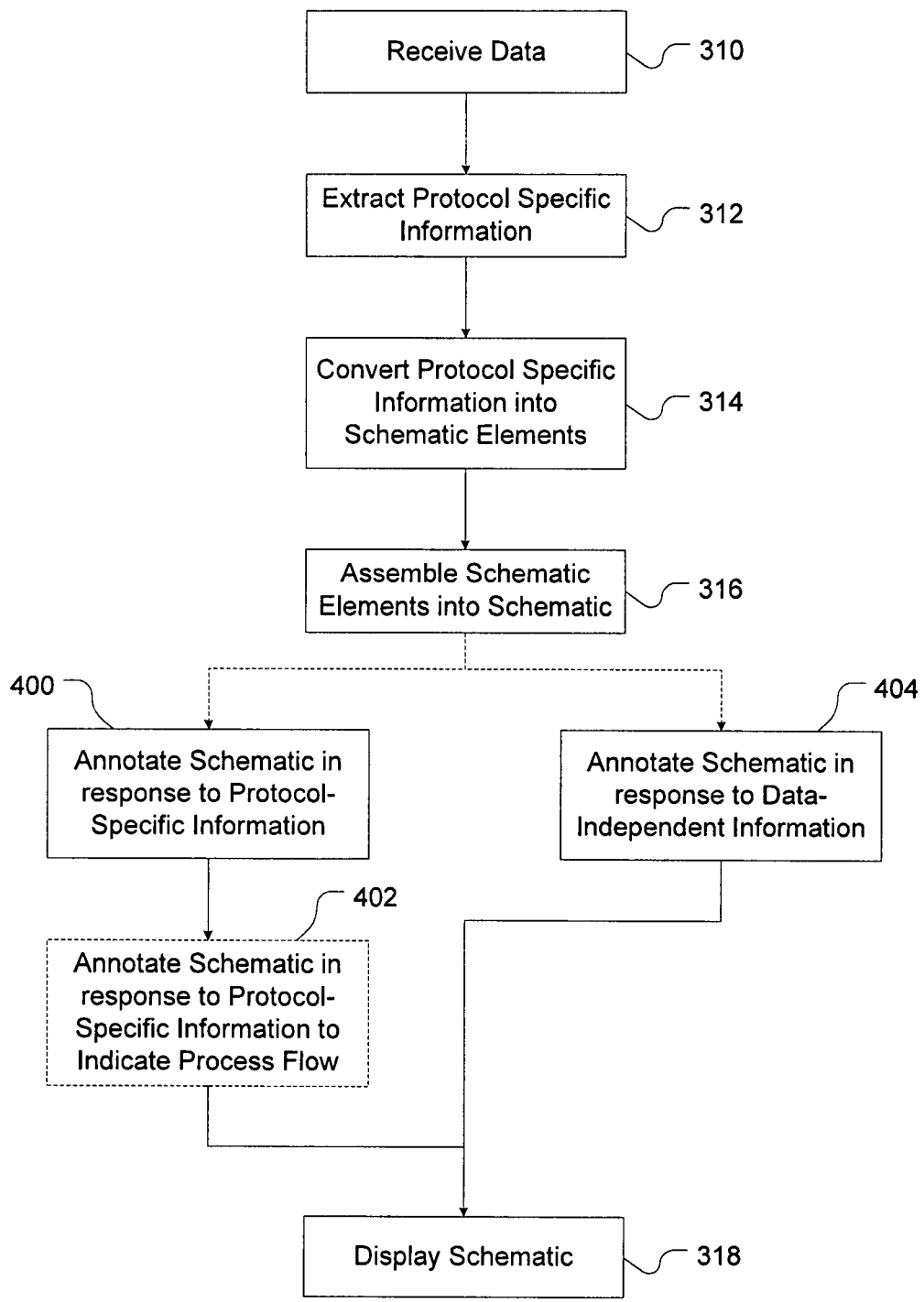

SCHEMATIC DISPLAY OF PROTOCOL-SPECIFIC INFORMATION

CROSS-REFERENCE TO RELATED APPLICATION

This application is a continuation-in-part of commonly assigned co-pending U.S. patent application Ser. No. 11/612,639 entitled "Symbolic Representation Of Protocol-Specific Information," filed on Dec. 19, 2006, the subject matter of which we incorporate by reference.

BACKGROUND

Analyzing and debugging systems using communications among their components has become increasingly difficult. Rising complexity, increasing performance, and variety of protocols within a circuit present difficult obstacles for validation engineers attempting to identify and track errors.

A protocol analyzer is an instrument that is designed to display, validate, and measure communications. Such communications may include data in a variety of protocols. The protocol analyzer typically presents packets and transactions for analysis by a user. The packets and transactions are typically represented in a "box car" format by displaying boxes with a text label for a field of a packet and a text message corresponding to the data within the field. A color may be used to distinguish fields from one another.

Unfortunately, data from differing protocols are displayed in the same "box car" format. Thus, without a detailed inspection of a field of the data, the user cannot determine a difference between the protocols or between packets within a protocol. In addition, the box car diagrams for different protocols may be displayed in separate screens, making it difficult to correlate events among the protocols.

In addition, packets are commonly displayed with earlier fields on the left and later fields on the right. Subsequent packets are displayed below older packets. Although a packet may have a field indicating a time, there is no visual indicator of the time relationship of the packets. In particular, there is no visual indicator of a time relationship between packets from different channels or communications links. Thus, it is difficult for a user to correlate the occurrence of packets over time. Although a user may reorder the packets to view packets associated with a particular transaction, there is no visual indication of the time relationship of that transaction with other packets or transactions.

Furthermore, a user may zoom in or out on the display of the packets. However, since the information contained within the fields of the packets are represented by text, as a user zooms out, the text eventually becomes unintelligible. Thus, it is difficult for a user to both view a large number of packets and still be able to determine the information contained within the packet.

Users are typically most interested in errors. A different color may indicate that a field, packet or other structure include an error. However, since color has been used extensively to identify different fields, a different color for an error does not draw the user's attention to it in a sea of other colors. In addition, users are able to arbitrarily assign colors. As a result, the effectiveness of color to indicate an error is reduced further.

In a box-car display, an arrow can indicate of a direction of a packet. However, the arrow only indicates whether the packet is sent toward or away from a root complex. In addition, the user must decode an identification field in the packet to determine which device is sending the packet. A user must rely on this textual device identification to manipulate the view of the packets.

Accordingly, a need remains for an improved display of protocol-specific information.

SUMMARY

A test and measurement instrument for displaying data includes an acquisition system configured to receive an input signal, a processor coupled to the acquisition system and configured to generate a schematic from protocol-specific information within the input signal, and a display coupled to the processor and configured to display the schematic.

A method of displaying data in a schematic display includes receiving data, extracting protocol-specific information from the data, converting the protocol-specific information into schematic elements, assembling schematic elements into a schematic, and displaying the schematic.

BRIEF DESCRIPTION OF THE DRAWINGS

FIG. 3 is a block diagram illustrating examples of connections in a schematic display of FIG. 1.

FIG. 4 is a block diagram illustrating examples of elements of a device in a schematic display of FIG. 1.

FIG. 10 is a block diagram illustrating an initialization and updating of schematic elements in a schematic display of FIG. 1.

FIG. 22, is a flowchart showing annotation of schematic elements in a method of displaying data in a schematic display.

DETAILED DESCRIPTION

Figure 1:
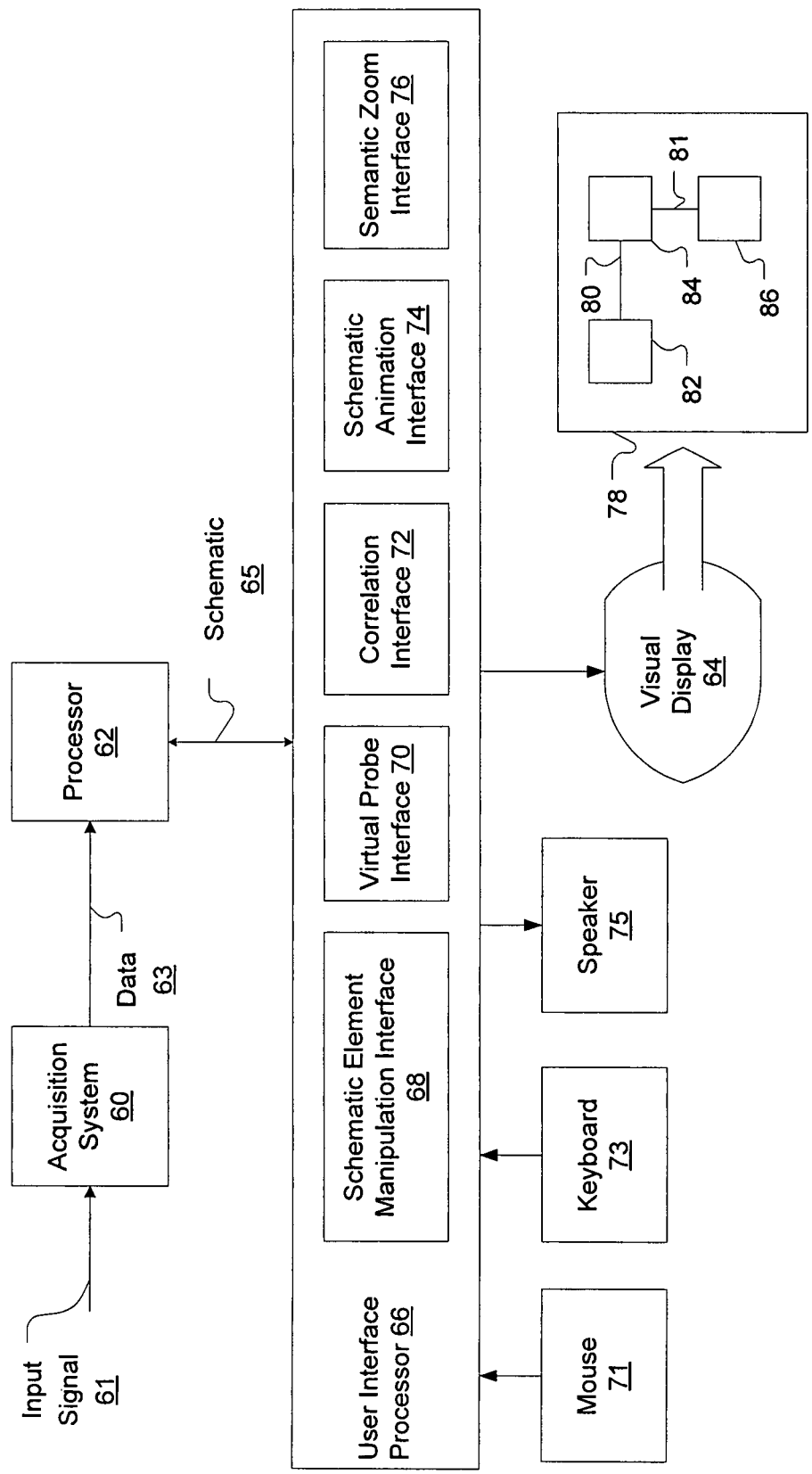
FIG. 1 is a block diagram of a test and measurement instrument according to an embodiment of the invention.

FIG. 1 is a block diagram of a test and measurement instrument according to an embodiment of the invention. The test and measurement instrument includes an acquisition system 60, a processor 62, a display 64, and a user interface processor 66. The acquisition system 60 is configured to receive an input signal 61. The acquisition system 60 converts the input signal 61 into data 63.

In one embodiment, the test and measurement instrument is a logic analyzer. The acquisition system 60 may be a probe and associated circuitry to sense the input signal 61 within a device under test (DUT) and convert the input signal 61 into the data 63. In another embodiment, the acquisition system 60 may include one or more processors to aid in converting the input signal 61 into the data 63. Any combination of circuitry that converts the input signal 61 into data 63 representing the input signal 61 may be an acquisition system 60.

In one embodiment, the test and measurement instrument is a hardware device. In another embodiment, the test and measurement instrument is a software application. Another embodiment includes a combination of hardware and software. A test and measurement instrument can be implemented by any combination of such hardware and software processing.

In an embodiment, the acquisition system 60 can acquire input signals 61 in real time. For example, the acquisition system 60 can be a probe that records a voltage over time at a probe location. In another embodiment, the input signal 61 can be data that was previously stored on a storage device. For example, a software application running on a purpose processor can read the input signal 61 data from a file on the storage device. In another example, that has been transferred over a computer network to the test and measurement instrument. A test and measurement instrument can include any combination of such real-time and delayed or offline processing.

The processor 62 is coupled to the acquisition system 60 and is configured to generate a symbolic representation of protocol-specific information within the input signal 61. In this embodiment, the symbolic representation is a schematic 65 output from processor 62.

The processor 62 can be a variety of devices. Such devices include general purpose processors, application specific integrated circuits, programmable logic devices, or the like. In addition, the processor 62 may be any combination of such devices.

As used in this description, a schematic is a representation of a circuit or system with a focus on devices, functions, operations, connections, links, or the like. A designer typically designs a system using a schematic. Such a schematic can have any variety of detail. For example, a schematic can have detail down to a layer structure for semiconductor transistors used in the corresponding circuit or even further specificity. In another example, a schematic can include a high-level block-diagram with blocks representing combinations of components and systems.

Schematic elements are objects that form a schematic. Using the examples above, schematic elements can include transistors, semiconductor layers, discrete components, or the like. Other examples include system blocks such as a computer, a data bus, a peripheral device, or the like. Schematic elements are not limited to just the components within a schematic. A schematic element can include a connection or a link between components.

Furthermore, a schematic element is not limited to reference physically embodied elements. For example, a function within a device may be a schematic element. Another example is a group of channels formed through one physical connection. Although these examples are associated with physical components, there are no physical components with a direct correspondence to the function or channels. However, these elements can still be associated with separate schematic elements. Thus, a schematic element can represent physical components or any abstraction of such systems, components, configurations, connections, operations, or the like.

Using the logic analyzer example described above, the input signal 61 may be electronic signals on the DUT tested by the logic analyzer. These signals may represent data 63 embodied by the input signal 61. The data 63 may be further categorized if it complies with a protocol. Groups of the data 63 may correspond to data organizations defined by the protocol.

Protocol-specific information is an abstraction of the data 63 according to one or more protocols. For example, a protocol may define a packet including a header and a data payload. When the data 63 is received, it may be analyzed to determine if it complies with the protocol. If so, a first portion of the data 63 corresponds to the packet. Within that first portion, a second portion corresponds to the header and a third portion corresponds to the data payload. Thus, the protocol-specific information includes information such as the existence of a packet, the existence of a header, the contents of the header, compliance of the packet with the protocol, or any other relationship between the data 63 and the protocol.

Protocol-specific information is not limited to any specific implementation or medium. For example, the protocol-specific information may be associated with a serial implementation, a parallel implementation, a combination of serial and parallel implementation, or the like. Furthermore, such protocols may be embodied in a variety of media. For example, as described above, the protocol may be embodied in serial communications between electronic components of a system. Alternatively, the protocol may be embodied in a radio frequency, infrared, or other wireless link between devices. The protocol-specific information may describe communications in any implementation or media.

Although the protocol may be a single protocol, the protocol is not limited to only one protocol or any particular subset of the protocol. For example, one protocol may be encapsulated within another protocol within the data 63. Alternatively, one protocol may have a variety of layers defined for communications within the data 63. For example, a data-link layer and a transaction layer may simultaneously exist in the data 63. Any number of protocols, layers, or the like may exist within the data 63.

The processor 62 is configured to generate a schematic 65 from the protocol-specific information. As described above, a schematic 65 is a collection of schematic elements representing devices, connections, functions, or the like. In the schematic 65, the schematic elements are represented by symbols. In this context, a symbol is a graphical or other abstract visual representation of the protocol-specific information. Symbols can be constructed by varying a wide variety of characteristics. Such characteristics include shape, size, in-fill, line type, line width, color, ornamentation, deformation, or the like.

As the schematic 65 is a collection of symbols, the schematic is a symbolic representation. A symbolic representation includes the meaning behind the individual symbols. The symbolic representation can include a representation of protocol-specific information and thus have meaning extending beyond the individual symbols themselves. For example, orientation of schematic elements can convey a number of intermediate devices between a source and destination device. Schematic elements for such devices could be placed in the schematic such that intervening devices are placed between the source and destination device schematic elements. Thus, through the placement of schematic elements in relationship to one another, the user may visually comprehend a relationship between devices creating the packets.

A schematic 65 allows for a greater information density than other textual representations. For example, as size decreases, a schematic element may retain enough identifying features to still convey the information embodied by the schematic element. In contrast, for a similar decrease in size, text may become unreadable. Since schematic elements may be decreased in size more so than text without affecting the delivery of information, more schematic elements may be displayed on a given display, increasing possible information density of a display.

The schematic elements as used herein are distinct from textual representation using text to convey information. When using text, a higher level of cognition is required to interpret the text that is not required to interpret the meaning of the symbols. The interpretation of symbols is performed by the "perceptual" process of a user's brain. Visual processing within the brain may be invoked without higher level cognitive functions such as language, reasoning, etc. For example, flow of a packet can be represented by a traveling pulse on a connection in a schematic display. Thus, the user can see the pulse and without having to process a device identification field or a direction arrow, the user acquires an understanding of the location, devices, directions, or the like associated with that packet. As a result, in the schematic display, the use of labels, numbers, text and other elements that require cognitive processing can be minimized or eliminated altogether.

The use of symbols for schematic elements provides several advantages. For example, as described above, the interpretation of the symbols uses a lower level of cognition that is inherent in the way we see. Patterns, process flow, errors, and other artifacts from a symbolic representation of protocol-specific information are easily distinguished from other "uninteresting data" also displayed. In addition, differing protocols may be used within the input signal 61. The different protocols may be represented by differing schematic elements. Thus, relationships of data conforming to the various protocols can be reflected in the schematic elements such that the protocols are distinguished.

The display 64 can be any device that can visually, aurally, or tactilely present information to a user. For example, the display 64 can be a monitor, liquid crystal display (LCD) panel, a projection display, or the like. Although the display 64 can be limited to a visual display, the display 64 can include other components such as the speaker 75 or other aural or tactile interfaces.

The display 64 displays the schematic 65. An image 78 in FIG. 1 illustrates an example of a schematic display of the protocol-specific information within the data 63. As used in this description, a schematic display is a displayed schematic 65. The schematic display can, but need not show all schematic elements of the schematic 65.

The image 78 includes multiple schematic elements. Symbols 82, 84, and 86 can represent devices in a device under test (DUT). Lines 80 and 81 can represent connections between the represented devices. Although one particular example of a schematic display has been given in FIG. 1, more detail will be provided below for other examples. Furthermore, the display 64 is not limited to the symbols or schematic elements illustrated in the image 78.

Although particular connections have been described between components of the test and measurement instrument, any one or all of the components can be coupled through communications links. For example, the acquisition system 60 and the processor 62 may be in the same location as a device-under-test. However, schematic 65 may be communicated over a communications link, such as a computer network, to the user interface processor 66. Any distributed placement of components can be implemented.

Figure 2:
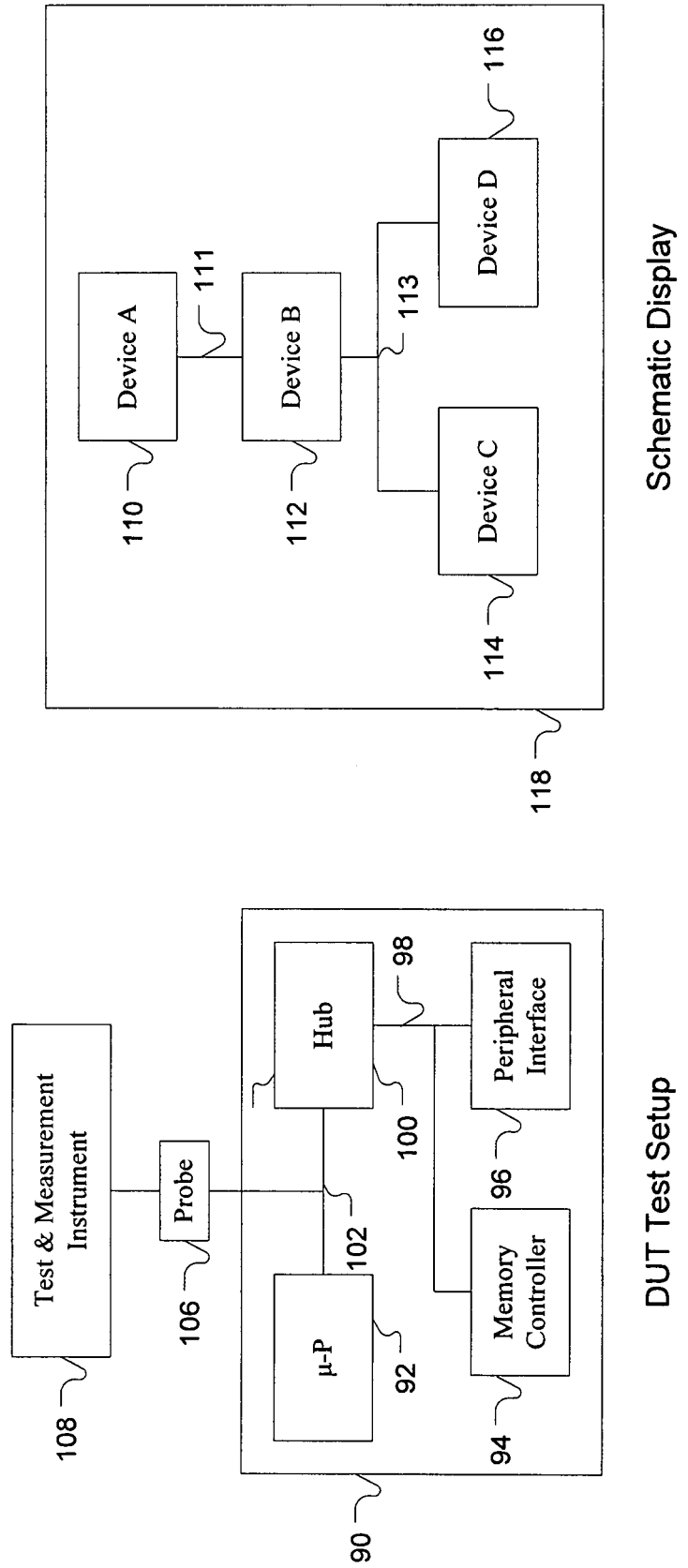
FIG. 2 is a block diagram illustrating a relationship of a device under test and a schematic display of FIG. 1.

FIG. 2 is a block diagram illustrating a relationship of a device under test and another example of schematic display 78 of FIG. 1. A DUT test setup includes a test and measurement instrument 108 coupled to a DUT 90 through a probe 106. In this example, the DUT 90 includes a microprocessor 92 coupled to a hub 100 through a first bus 102. A memory controller 94 and a peripheral interface 96 are coupled to the hub 100 through a second bus 98.

When designing such a DUT a designer may use a schematic in the design process. As a result, the designer may visualize the system in terms of the devices within a schematic. Similarly, a user debugging the DUT can use the schematic from the design process to conceptualize the DUT. In debugging the DUT using the instrument 108, the user can probe the DUT through the probe 106. In this example, the probe 106 monitors communications between the microprocessor 92 and the HUB 100. As a result, the user can observe the communications over the bus 102 to debug the DUT.

A list display or box-car diagram of data received through the probe 106 displays the data in a textual format. In some examples, the data is arranged on the display according to packets, frames, or other data organizations of the protocol. In some protocols, a field in a packet or other portion of the data is an identification of a device involved in the communications. However, even if the device identification is available, it is displayed as text in the associated packet. It is not presented to the user in the way that the user has conceptualized the DUT. That is, the information is not presented in a schematic.

FIG. 2 shows an example of a schematic display 118 generated in response to data collected by the probe 106. The schematic display 118 includes schematic elements 110, 112, 114, and 116 corresponding to devices A, B, C, and D, respectively. In this example, device A 110 corresponds to the microprocessor 92. Device B 112 corresponds to the hub 100. Device C 114 corresponds to the memory controller 94, and device D 116 corresponds to the peripheral interface 96. Connection 111 corresponds to the bus 102. Connection 113 corresponds to the bus 98.

This schematic display 118 was generated from the data received through the probe 106. The probe 106 monitored communications between the microprocessor 92 and the hub 100. Within these communications, protocol-specific information identified a communication between two devices. These devices were labeled as device A and device B. Schematic elements 110 and 112 were created to illustrate the discovered devices. The connection 111 was added, illustrating the link over which the communications traveled.

In this example, the probe was only probing the bus 102. However, in the DUT 90, the microprocessor 102 can communicate with the memory controller 94 and the peripheral interface 96 through the hub 100. Thus, communications travel between the microprocessor 92 and the hub 100 over the bus 102 that are intended for the memory controller 94 or the peripheral interface 96. Since the probe 106 monitors these communications, the protocol-specific information extracted from the data includes information on the memory controller 94 and the peripheral interface 96. As a result, device C 114 and device D 116 are displayed in the schematic display 118 representing the memory controller 94 and the peripheral interface 96.

In addition, by examining the communications between the processor 92 and the memory controller 94 or the peripheral interface 96, the existence of the bus 98 can be discovered. As a result, connection 113 is illustrated linking device B 112 to device C 114 and device D 116 to represent bus 98. Thus, not only can devices physically separated from the probe location be discovered, but connections between such devices can be discovered and illustrated in the schematic display as schematic elements.

By representing the protocol-specific information in such a way, the user is presented with a schematic display 118 similar to the schematic that was used to design the DUT. In this example, the schematic display 118 represents the processor 92, hub 100, memory controller 94, and peripheral interface 96 as blocks labeled as devices. However, depending on the scope of the protocol-specific information, initial schematics, data-independent information, and other information as will be described below, the schematic display 118 can have a degree of accuracy that can approach, if not attain, a degree of accuracy in an actual schematic, a DUT layout, or other conceptualization of the DUT.

FIG. 3 is a block diagram illustrating examples of connections in a schematic display of FIG. 1. These examples illustrate a development of a schematic display in response to additional protocol-specific information. As described above, a connection between two devices can be discovered from the protocol-specific information. In schematic display 121, device A 120 and device B 122 have been discovered. The connection between them is illustrated as connection 124. However, connection 124 could have been generated from a limited amount of protocol-specific information. For example, a single packet sent from device A 120 to device B 122 can be used as the source for connection 124.

As additional protocol-specific information expands the information on the connection 124, the schematic elements forming the connection 124 can be added, updated, manipulated, changed, or the like. Schematic display 123 illustrates one example of how a schematic display can be updated with more protocol-specific information. For example, over the same communications link, two devices may have communications channels. Although the communications travel over the same physical link, the channels are conceptually distinct.

In this example, connection 124 includes multiple channels 126. Protocol-specific information was received indicating that device A 120 and device B 122 are communicating using channels. Thus, the channels 126 are illustrated between device A 120 and device B 122. In addition, in this example, the connection 124 could have been, but was not replaced. Connection 124 remains, linking the channels 126 as part of the connection 124.

This example shows that schematic elements can, but need not be directly associated with physical objects. Although device A 120 and device B 122 can correspond to physical devices and connection 124 can correspond to a physical bus, schematic elements can represent conceptual elements. In this example, the conceptual elements are the channels 126 of communications between device A 120 and device B 122. The channels 126 represent logically independent communications links between device A 120 and device B 122.

This example illustrates another aspect of schematic elements. Schematic elements need not be limited to one layer of a protocol or one particular protocol. For example, connection 124 can represent a physical link between device A 120 and device B 122. This physical link could have been discovered from analyzing protocol-specific information in a physical link layer of a protocol. The physical link layer may not have any information regarding abstractions of communications over the physical link.

However, a transaction link layer may provide for the creation of communication channels through the physical link. By analyzing protocol-specific information in the transaction link layer, communication channels could be discovered and represented by channels 126. For example, the transaction link layer may define a procedure for establishing a communications channel. Packets sent between device A 120 and device B 122 according to this procedure may indicate that communication channels are being established. Accordingly, these channels can be represented by channels 126. Furthermore, although four lines have been illustrated in describing the channels 126, the number of channels can also be any number and can be represented by any number of schematic elements.

FIG. 4 is a block diagram illustrating examples of elements of a device in a schematic display of FIG. 1. As described above, conceptual elements can be illustrated as schematic elements. FIG. 4 illustrates more examples of these conceptual elements. Within device 120, there can be multiple operations, states, threads, functions, or the like. As used in this discussion, a function includes any such conceptualization in processing, division of resources, operations, states, or the like.

Device A 120 includes two functions, function A 136 and function B 138. Function A has associated channels 128 and function B 138 has associated channels 130. Although channels 128 and channels 130 have been illustrated as distinct, channels 128 and channels 130 can, but need not have shared or common channels. Similar to the connections described above, the channels 128 and 130 can be part of connections 132 and 134, respectively.

As described above, device A 120 can be associated with channels 126. There can, but need not be a one to one correspondence between the channels 126 and the channels 128 and 130. In this example, the connection mapping 140 illustrates a mapping within device A 120 that maps channels 126 to channels 128 and 130.

The connection mapping 140 is another example of a schematic element that can, but need not describe an actual physical component. For example, the connection mapping 140 can correspond to physical structures within the physical component associated with device A 120. Alternatively, the connection mapping 140 can correspond to a mapping performed using software, firmware, or the like within device A 120. Thus, the connection mapping 140 can correspond to any combination of hardware, firmware, software, microcode, configurable logic, or the like.

Referring back to FIG. 1, in an embodiment a test and measurement instrument can include a correlation interface 72. The correlation interface 72 is configured to receive a correlation input identifying a first schematic element and a second schematic element of the schematic 65. The processor 62 is further configured to adjust the schematic 65 such that the first and second schematic elements are correlated in the schematic 65. As used herein, a correlation is a structural, functional, or qualitative relationship. A correlation is not limited to a strict time correlation.

Figure 5:
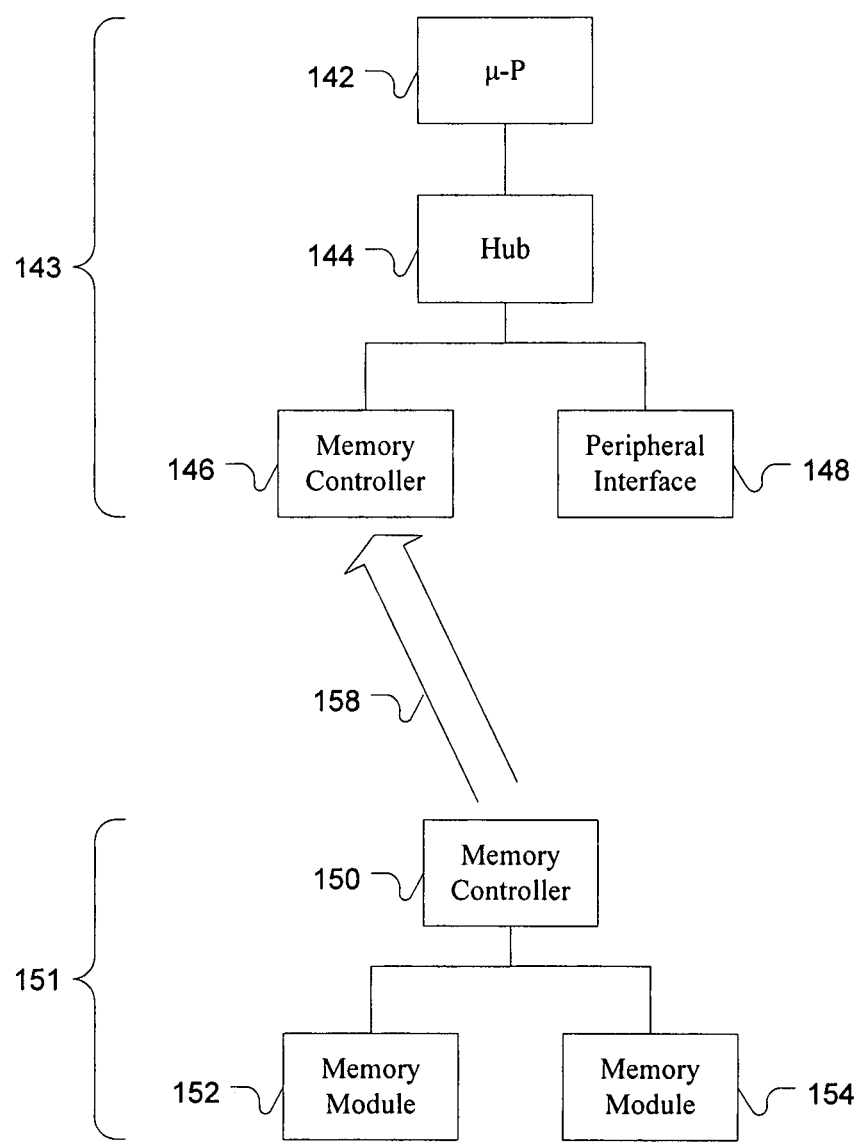
FIGS. 5 and 6 are block diagrams illustrating a correlation of schematic elements in a schematic display of FIG. 1.
Figure 6:
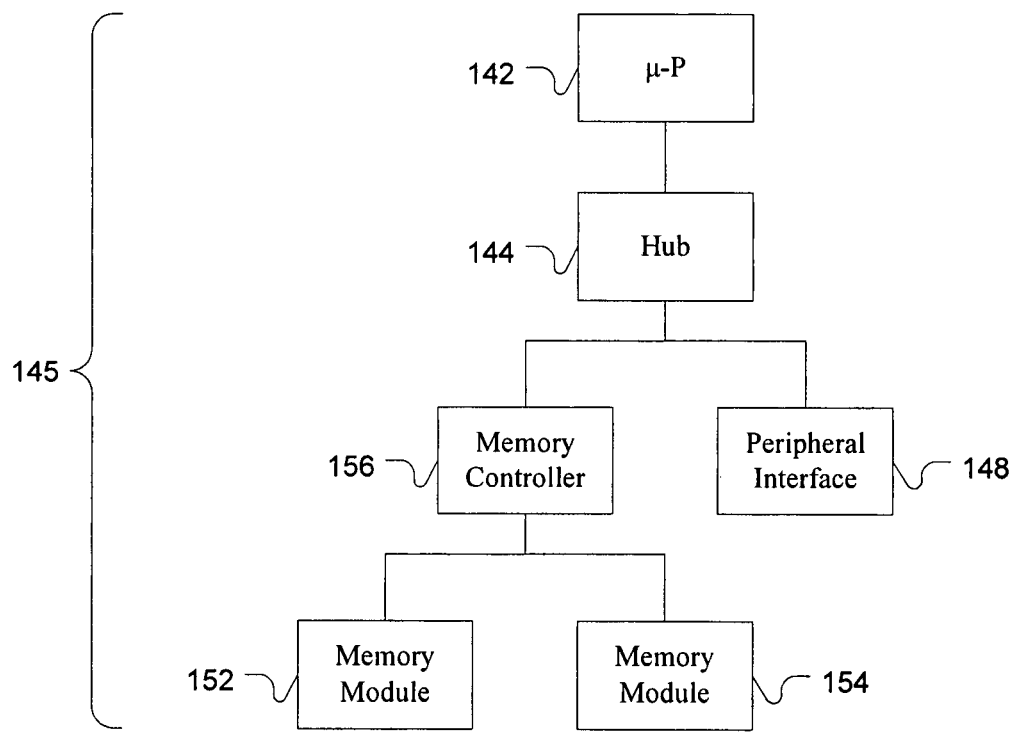

FIGS. 5 and 6 are block diagrams illustrating a correlation of schematic elements in a schematic display of FIG. 1. Referring to FIG. 5, a first schematic display 143 and a second schematic display 151 are displayed. Although the schematic displays 143 and 151 are illustrated in the same figure, the schematic displays 143 and 151 may be presented on the same or different displays 64.

In the first schematic display 143, a microprocessor 142, a hub 144, a memory controller 146, and a peripheral interface 148 are displayed as schematic elements. The second schematic display 151 includes a memory controller 150, and first and second memory modules 152 and 154, respectively.

In this example, both the first schematic display 143 and the second schematic display 151 are associated with a single DUT. However, the schematic displays 143 and 151 were generated from different sources of information. For example, schematic display 143 was generated from a probe between the physical components associated with the microprocessor 142 and the hub 144. As described above, the memory controller 146 and peripheral interface 148 were discovered from the protocol-specific information between the microprocessor 142 and the hub 144. Similarly, schematic display 151 was generated from a probe between the physical components associated with the memory controller 150 and the memory modules 152 and 154. Thus, the protocol-specific information can be extracted from multiple sources of data.

Although different sources of information have been described above as associated with different physical locations, the different sources of information can include different extractions of protocol-specific information from the same data. For example, one process can extract a first set of protocol-specific information from the data related to the communications between the microprocessor 142 and the memory controller 146, and a second process can extract a second set of protocol-specific information from the same data related to communications between the memory controller 15 and the memory modules 152 and 154.

A correlation between memory controller 146 and the memory controller 150 can be determined in response to the protocol-specific information generating the schematic displays 143 and 151. For example, the protocol-specific information for each memory controller 146 and 150 could have the same device identification. In another example, any one or both of the protocol-specific information sets can include sufficient information to correlate the two memory controllers 146 and 150. Thus, the correlation of the memory controllers 146 and 150 could occur automatically.

In another example, a user may specify a correlation between schematic elements. Arrow 158 illustrates a user specified correlation. The user can generate the correlation in a variety of ways. For example, the user could select the memory controllers 146 and 150 and enter a command defining the correlation. In another example, the user can drag one memory controller on to the other to indicate the correlation.

Regardless of the source of the correlation, the instrument can process the schematic displays 142 and 145 with the new correlation. Referring to FIG. 6, a schematic display 145 includes the microprocessor 142, hub 144, and peripheral interface 148 of schematic display 143 of FIG. 5. In addition, the schematic display 645 includes the memory modules 152 and 154 of the schematic display 151 of FIG. 5. Because of the correlation, the memory controllers 146 and 150 of FIG. 5 have been merged into the memory controller 156. As a result, communications, channels, functions, or any other information associated with the schematic elements can now be illustrated continuously between any of the schematic elements. For example, a memory request from the microprocessor 142 can be illustrated continuously through the hub 144 and the memory controller 156 to the destination memory module 152.

Although the example of FIG. 1 has been used here, any schematic elements that are associated can be linked into a schematic display as described above. Although the same device has been used in the above example, the associated schematic elements can, but need not represent the exact same object. For example, the correlated schematic elements could be parts of a larger device or system. In addition, the correlated schematic elements need not be limited to devices. Any schematic element can be correlated with any other, regardless of type, location, status, or any other attribute.

Referring back to FIG. 1, in an embodiment, the test and measurement instrument can include a schematic element manipulation interface 68. The schematic element manipulation interface 68 is configured to receive a selected schematic element input. The processor 62 is further configured to adjust schematic elements associated with the selected schematic element input in the schematic.

Figure 7:
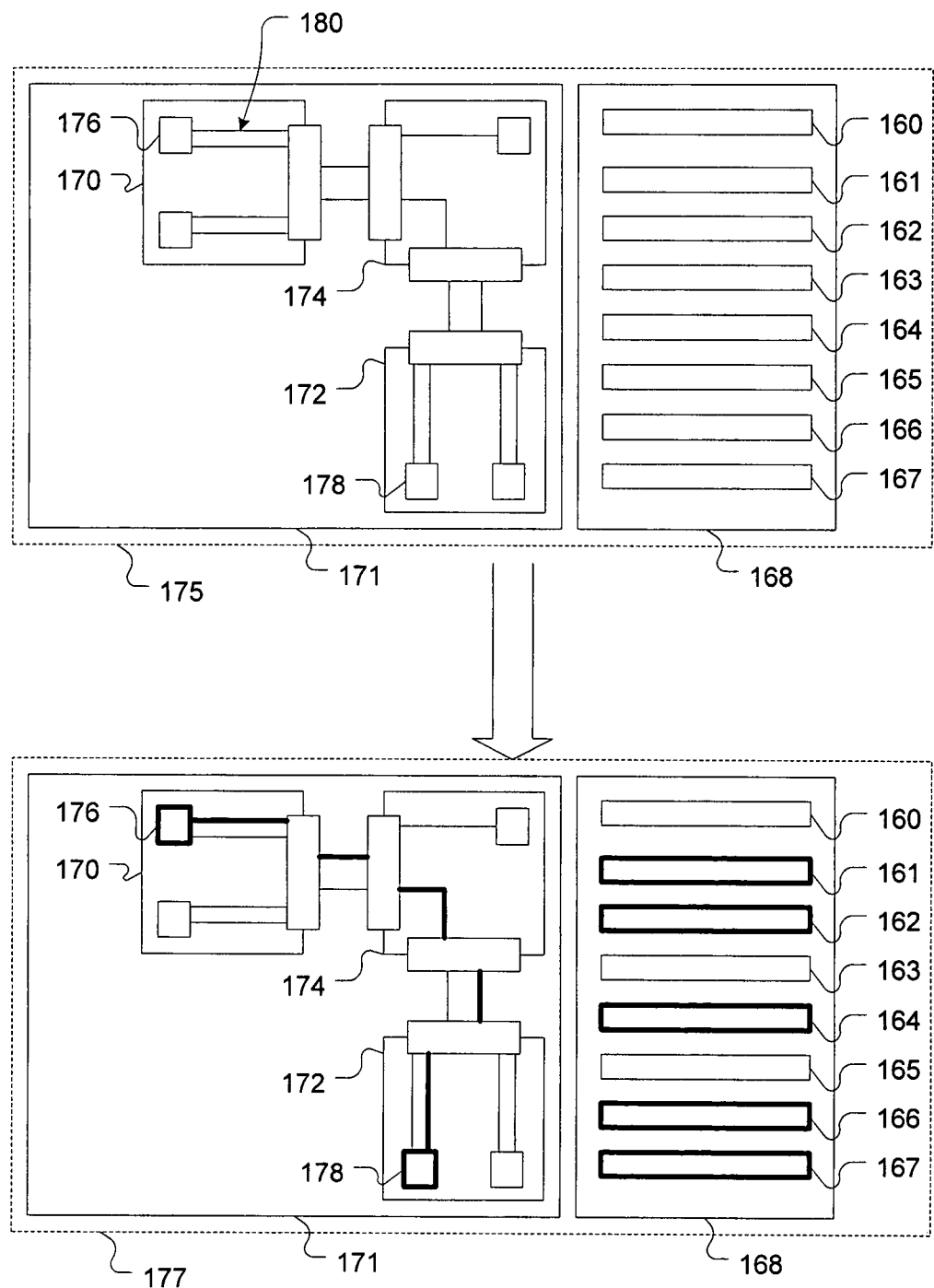
FIG. 7 is a block diagram of an example of highlighting schematic elements in response to a selection in a schematic display of FIG. 1.

FIG. 7 is a block diagram of an example of highlighting schematic elements in response to a selection in a schematic display of FIG. 1. Highlighting schematic elements is one example of an adjustment of the schematic elements associated with a selected schematic element. As used in this description, highlighting includes any change that can focus the user's attention towards the schematic element. For example, highlighting can include flashing, a different color, a new border, an annotation, or the like.

A display 175 and an updated display 177 are illustrated in FIG. 7. The updated display 177 illustrates the change in display 175 after a selection. A first schematic display 171 of the display 175 includes a first device 170, a second device 172, and a third device 174. The first device 170 communicates to the second device 172 through the third device 174. In this example, a first function 176 of the first device 170 is communicating with a second function 178 of the second device 172.

The display 175 also has a listing window 168. The listing window 168 can show multiple packets 160-167. These packets 160-167 represent at least some of the data that was used to generate the schematic display 171.

In this example, the user selects a channel 180 associated with the function 176. The selection can be through the mouse 71, keyboard 73, or the like, or any other user interface coupled to the user interface processor 66 of FIG. 1. In response, the display 175 changes into the updated display 177. As can be seen in the schematic display 171 in the updated display 177, schematic elements associated with the selection have been highlighted. As a result, a user can easily see how a communication between function 176 reaches function 178 and vice versa.

In addition, the schematic elements forming the highlighted path were generated from protocol-specific information extracted from the data. As this data is displayed in the listing window 168, the protocol-specific information associated with the highlighted schematic elements can also be highlighted. Thus, not only are the schematic elements adjusted to indicate to the user a path taken by communications associated with selected schematic elements, but different displays illustrating the different presentations of the data can be highlighted for ease of interpretation. Furthermore, although one additional presentation of the data such as the listing window 168 has been described, any number of additional presentations can be used.

Although a channel has been illustrated in FIG. 7 as the schematic element that was selected, any schematic element may be selected. In response any associated schematic elements can be highlighted.

In addition, just as a schematic element can be selected to highlight data in other presentations, data in other presentations can be selected to highlight associated schematic elements. For example, packet 161 could be selected and the schematic elements in display 177 could be highlighted in response.

FIGS. 8-12 illustrate examples of development or animation of a schematic display 78 of FIG. 1. In one embodiment, a test and measurement instrument includes a schematic animation interface 74. The schematic animation interface 74 is configured to control an animation position. For example, the animation position can be controlled in response to a user input. In another example, the animation position can be controlled in response to an automated process. Regardless of the source, the processor 62 is further configured to adjust the schematic in response to a change in the animation position. For example, the processor 62 can be configured to adjust an amount of the protocol-specific information used to generate the schematic in response to the animation position.

An animation position is a position along a sequence of time. For example, in the animation of a movie, an animation position would represent a particular frame. As the animation position changes, so would the frame. In the context of a schematic display, the animation position represents a state of the schematic display at a particular point in time. For example, the animation position can represent the schematic as developed from the data up to a particular point in time. When the animation position changes, the data available for generating the schematic elements for the schematic can change. Thus, by manipulating the animation position, a schematic display can be generated corresponding to different times and corresponding different set of data.

The schematic animation interface 74 can include a variety of controls to manipulate the animation position. For example, such controls can include a play button, an animation position slider, a rewind button, a fast-forward button, a pause button, or the like. Through these controls, the user can manipulate the animation position and observe how the schematic develops.

Figure 8:
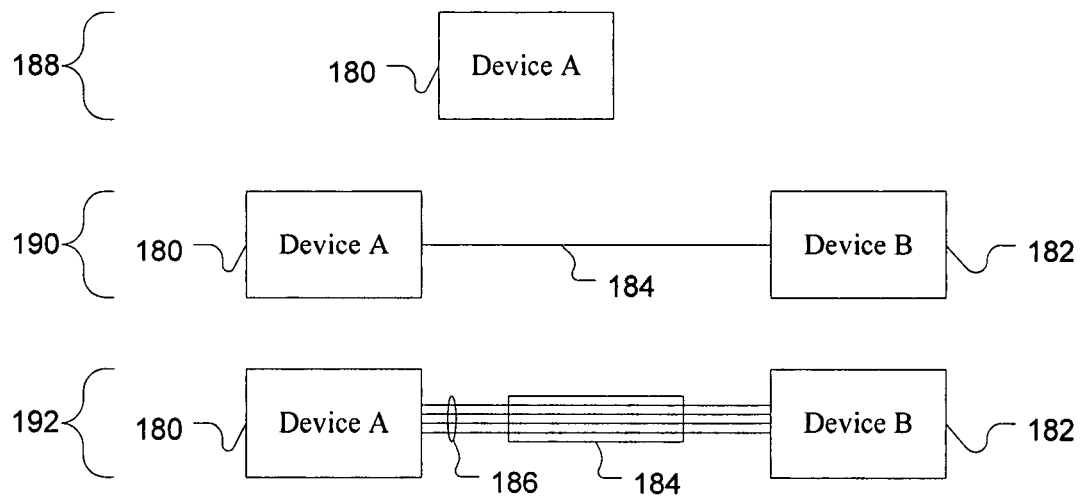
FIG. 8 is a block diagram illustrating a discovery and development of schematic elements in a schematic display of FIG. 1.

FIG. 8 is a block diagram illustrating a discovery and development of schematic elements in a schematic display of FIG. 1. At any point in time, a certain amount of protocol-specific information may be available. The development of the schematic display is illustrated as more protocol-specific information is available.

FIG. 8 includes multiple schematic displays. Schematic display 188 is a first schematic display generated from a first set of protocol-specific information. With the first set of protocol-specific information, device A 180 has been discovered. However, no other devices, connections, or the like have been discovered. Such a discovery can be made, for example, from a training packet sent by device A 180 to attempt to establish communications with other unknown devices. If no other device responds, all that is known is that the device A 180 exists since it sent the training packet. Thus, even though no other devices are known, the device A 180 can still be represented by a schematic element.

Schematic display 190 is generated from a second set of protocol-specific information. In this example, the second set of protocol-specific information has additional protocol-specific information that indicates that there is a device B 182 connected to device A 180 through a connection 184. This connection can be discovered, for example, from a response packet from device B 182.

Schematic display 192 is generated from a third set of protocol-specific information. In this example, the third set of protocol-specific information indicates that there are multiple channels 186 between device A 180 and device B 182. One example of the protocol-specific information leading to the channels 186 is multiple packets complying with a protocol level that utilizes multiple channels. As a result, the protocol-specific information corresponding to the multiple channels can be converted into schematic elements representing the channels 186.

The animation position from the schematic animation interface 74 can be controlled by a variety of sources. For example, the animation position can be user controlled. Thus, a user can specify where in the data or protocol-specific information the schematic elements should be extracted. Thus the user can control the development of the schematic display.

In another example, the animation position can be set to be automatically controlled. The animation position can represent a passage of time. Thus, the development or animation of the schematic display relates the passage of time.

Although user input and time have been described as being bases for the animation position, any basis for moving forward, backward, randomly, or the like through the data or the protocol-specific information can be used.

Figure 9:
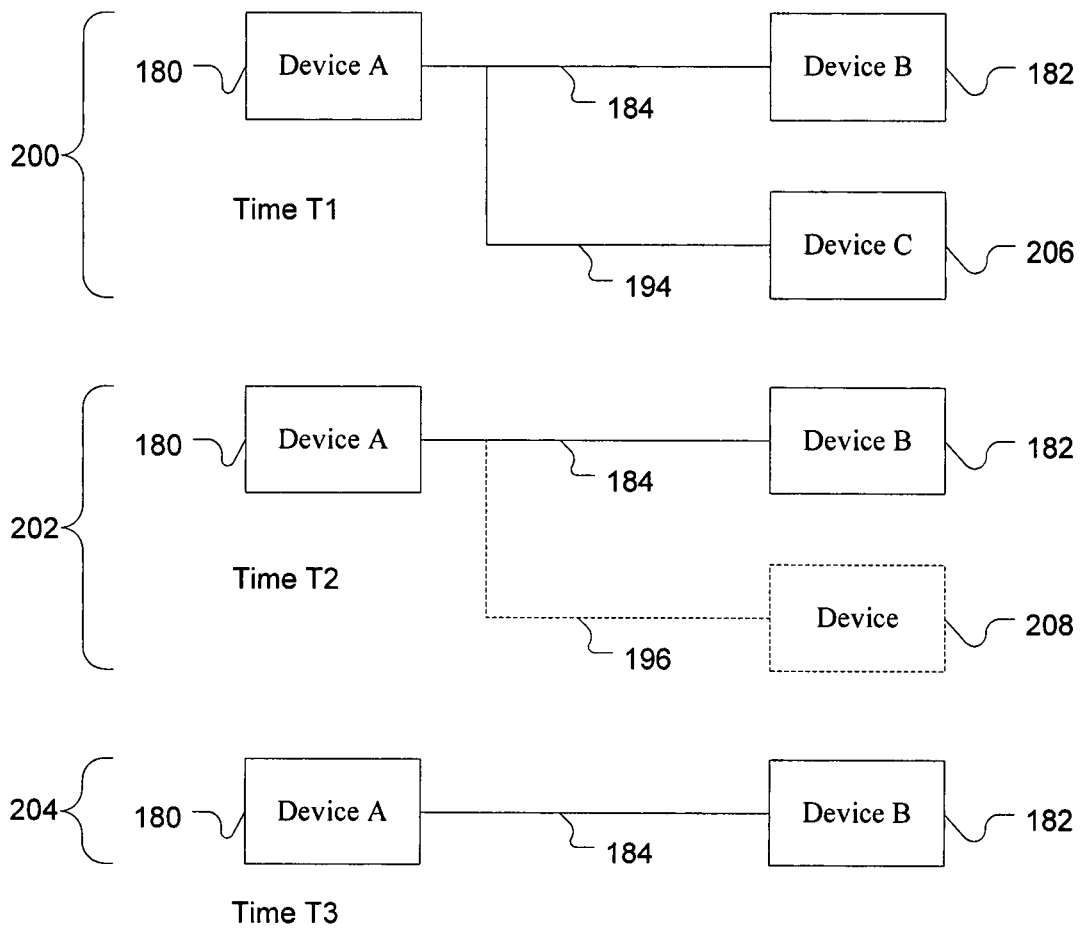
FIG. 9 is a block diagram illustrating a fading of schematic elements in a schematic display of FIG. 1.

FIG. 9 is a block diagram illustrating a fading of schematic elements in a schematic display of FIG. 1. As described above, schematic elements can be added to the schematic display as they are discovered through the protocol-specific information. However, just as protocol-specific information can indicate the presence of a device, other protocol-specific information or even the absence of protocol-specific information can indicate the absence of a device.

For example, schematic display 200 has device A 180, device B 182, and device C 206. Device A is connected to device B through connection 184. Device A is connected to device C through connection 194. In this example, the protocol-specific information that indicated the devices and connections in schematic display 200 was received by a time T1.

Schematic display 202 includes some of the same devices of schematic display 200. However, an amount of time has passed since the time T1. Thus, schematic display 202 indicates a state of the schematic display at time T2. In this example, during the intervening time period, no communications between device C 206 and other devices were received. As a result, there is a reduced amount of certainty that device C 206 still exists or operates. Accordingly, the schematic elements associated with device C 206 have been changed into the device 208 and the connection 196. In this example, the adjusted schematic elements are illustrated with a dashed line.

Schematic display 204 corresponds to time T3 after time T2. Schematic display 204 does not include a device that corresponds to device C 206 or device 208 at an earlier time. In this example, a sufficient amount of time has passed between time T1 and time T3 so that device C 206 is no longer considered part of the schematic.

Referring to both FIG. 8 and FIG. 9, schematic elements are added, updated, or otherwise modified such that a changing certainty of the devices or other components can be presented to the user. Thus, by changing schematic elements, the certainty of those schematic elements can be conveyed to the user through the schematic display. Fading is one example of how schematic elements can be adjusted to convey certainty.

Any attribute that can be varied, continuously or discretely, can be used to indicate a degree of certainty. For example, other attributes include color, shade, shape, line weight, line style, size, or the like.

FIG. 10 is a block diagram illustrating an initialization and updating of schematic elements in a schematic display 78 of FIG. 1. An initial schematic can be used as a template for generating a schematic display. Schematic display 222 was generated from a template. The template can be from a variety of sources. For example, the template can be a schematic display previous acquired from the same or a similar DUT. In another example, the template can be created from device building blocks to form an expected schematic display before data is acquired from the DUT or a similar DUT. In this example, schematic display 222 includes device A 180, device B 182, device C 206, and connections 184 and 194.

Schematic display 224 illustrates a change from the schematic display 222 after receiving data. Schematic display 224 includes the data from the initialization of the schematic display up to time T4. By time T4, some communications have been detected between device A 180 and device B 182. Thus, device B 182 and the connection 184 from device B 182 to device A 180 remains unchanged. Although device B 182 and the connection 184 from device B 182 to device A 180 have not changed, the schematic elements forming these devices and connections could have been updated to reflect additional protocol-specific information extracted from the data received by time T4.

In contrast, little or no communication occurred between device A 180 and device C 206 (of schematic display 222). As a result, in schematic display 224, device C 206 has transformed into device 214. In addition, the connection 194 of schematic display 222 has transformed into connection 218. Both device 214 and connection 218 have been illustrated with a dashed line. The dashed line indicates that the certainty of the connection and the device has reduced. Although a dashed line has been used in this example, as described above, other changes can be used to indicate the certainty of the schematic elements.

Device 216 and connection 212 are newly formed in schematic display 224. Similar to device 214, which is illustrated reflecting its certainty, device 216 and connection 212 are illustrated reflecting their certainty. In contrast to device 214, device 216 and connection 212 were formed in response to protocol-specific information extracted from data acquired up to time T4. Some part of the protocol-specific information indicated that another device exists.

Schematic display 226 illustrates a change from schematic display 224 reflecting data received up to time T5. Device 214 and connection 218 have been removed from the schematic display 226 as no data associated with those elements was received by time T5. In contrast, additional data was received associated with device 216 of schematic display 224. As a result, device 216 was identified as device D 210. Similarly, connection 212 of schematic display 224 was identified as connection 220.

Schematic displays 222, 224, and 226 illustrate a development of a schematic display over time and the acquisition of new data. An expected device B 182 remained in the schematic display. An expected device C 206 faded and was eventually removed from the schematic display. An unknown device D 210 appeared in the schematic display. Thus, the user was presented with an evolution of the schematic display reflecting what was known or what was predicted from the received data.

Although the initial schematic has been described as being used at the start of collection of protocol-specific information, the initial schematic can be used at other points in time. For example, the initial schematic could be used to adjust the schematic display after some protocol-specific information has been converted into a schematic element. The initial schematic could be used to rearrange matching schematic elements and indicate expected or unexpected schematic elements.

Figure 11:
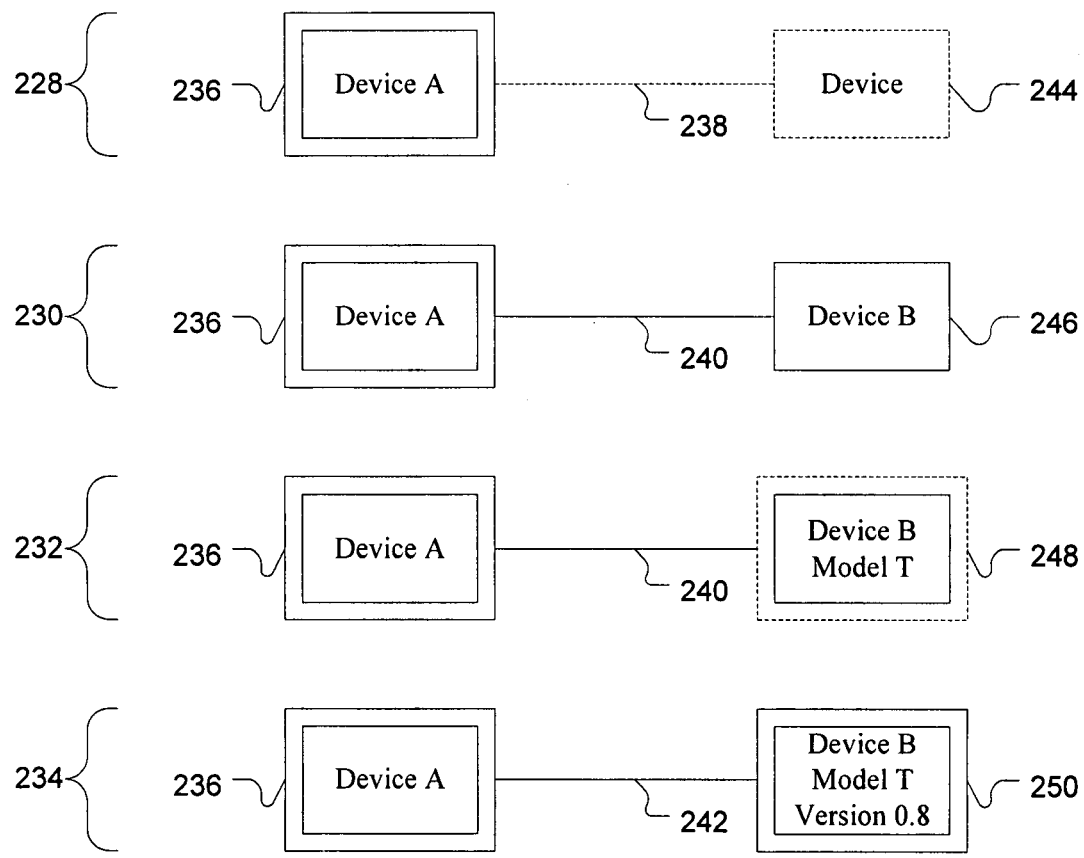
FIG. 11 is a block diagram illustrating a change in annotation of schematic elements in a schematic display of FIG. 1.

FIG. 11 is a block diagram illustrating a change in annotation of schematic elements in a schematic display of FIG. 1. Schematic display 228 illustrates a device A 236 coupled to a device 244 through connection 238. In schematic display 230, additional protocol-specific information has been extracted to identify device 244 as device B 246 coupled to device A 236 through connection 240. In schematic display 232, more protocol-specific information is extracted to identify device B 246 as device B model T 248. Similarly, in schematic display 234, the schematic elements have further evolved to identify device B model T version 0.8 250. Thus, as more protocol-specific information is extracted, schematic elements can be updated to reflect this information.

Figure 12:
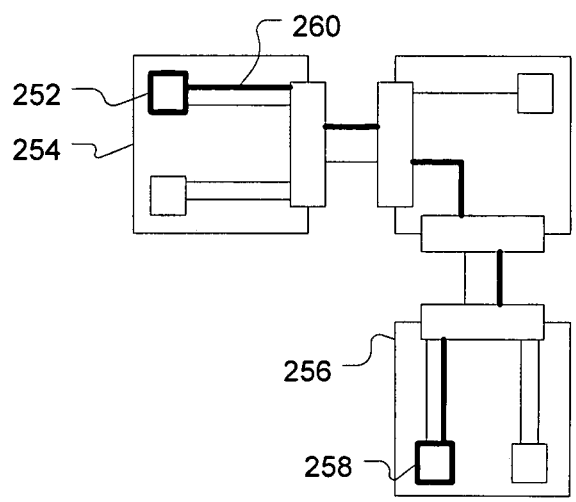
FIG. 12 is a block diagram illustrating an error associated with schematic elements in a schematic display of FIG. 1.

FIG. 12 is a block diagram illustrating an error associated with schematic elements in a schematic display of FIG. 1. Similar to FIG. 7 illustrating both devices, and functions and connections within devices, the schematic display of FIG. 12 illustrates devices, and functions and connections within multiple devices. In this example schematic display, an error has occurred. The error occurred in a communication between function 252 of device 254 and function 258 of device 256. As a result, schematic elements involved in the connection between functions 252 and 258 are highlighted. For example, connection 260 in device 254 was highlighted because communications between function 252 and 258 passed through connection 260. Thus, by a visual inspection, a user can quickly understand the path of the communication that experienced an error. Although the error has been identified in FIG. 12 by changing line weights of the lines of the schematic elements, other changes such as color, shading, ornamentation, or the like can be used. Any change that can focus the user's attention can be used.

Referring back to FIG. 1, in an embodiment, a test and measurement instrument can include a semantic zoom interface 76. The semantic zoom interface 76 is configured to control a semantic zoom level. For example, the semantic zoom level can be controlled in response to a user input. In another example, the semantic zoom level can be controlled in response to an automated process. Regardless of the source, the processor 62 is further configured to adjust a level of information detail in the schematic in response to the semantic zoom interface 76.

Figure 13:
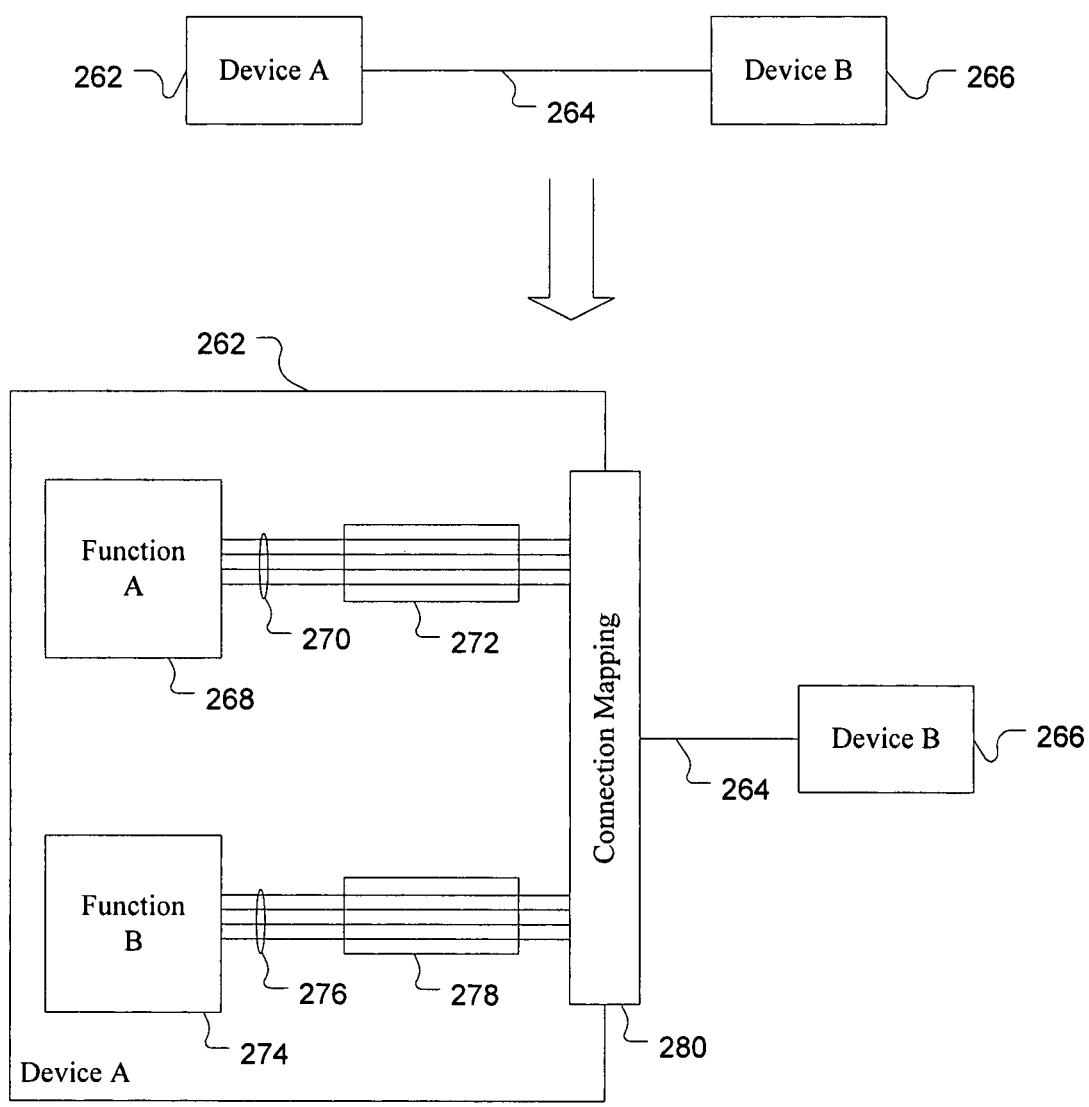
FIG. 13 is a block diagram illustrating a change in a level of information detail of schematic elements in a schematic display of FIG. 1.

FIG. 13 is a block diagram illustrating a change in a level of information detail of schematic elements in a schematic display of FIG. 1. The change in the level of information detail is referred to as semantic zooming. The semantic zoom level can represent what level of information detail should be presented. Before a change in the level of information detail, device A 262 was illustrated as a box with text. After the change, functions, connections, channels, or the like can be illustrated. In this example, functions 268 and 274, connections 272 and 278, channels 270 and 276, and connection mapping 280 have been added to the schematic elements illustrating device A 262. As a result, a user now has more information concerning the operation of device A 262.

A change in a level of information detail can, but need not affect every schematic element. In the example of FIG. 13, only the level of information detail of device A 262 was increased. In another example, the level of information detail in both device A 262 and device B 266 could be increased.

Although a semantic zoom interface 76 has been described, the test and measurement can include other position and size interfaces. For example, the test and measurement instrument can include a pan interface to pan the schematic display. In another example, the test and measurement instrument can include a physical zoom interface. Thus, the schematic display can be made larger or smaller in size without changing the level of information detail.

Referring back to FIG. 1, in an embodiment, a test and measurement instrument can include a virtual probe interface 70. In an embodiment, the virtual probe interface 70 is configured to receive a selected schematic element input corresponding to a selected schematic element. The processor 62 is further configured to display protocol-specific information from the input signal associated with the selected schematic element.

Figure 14:
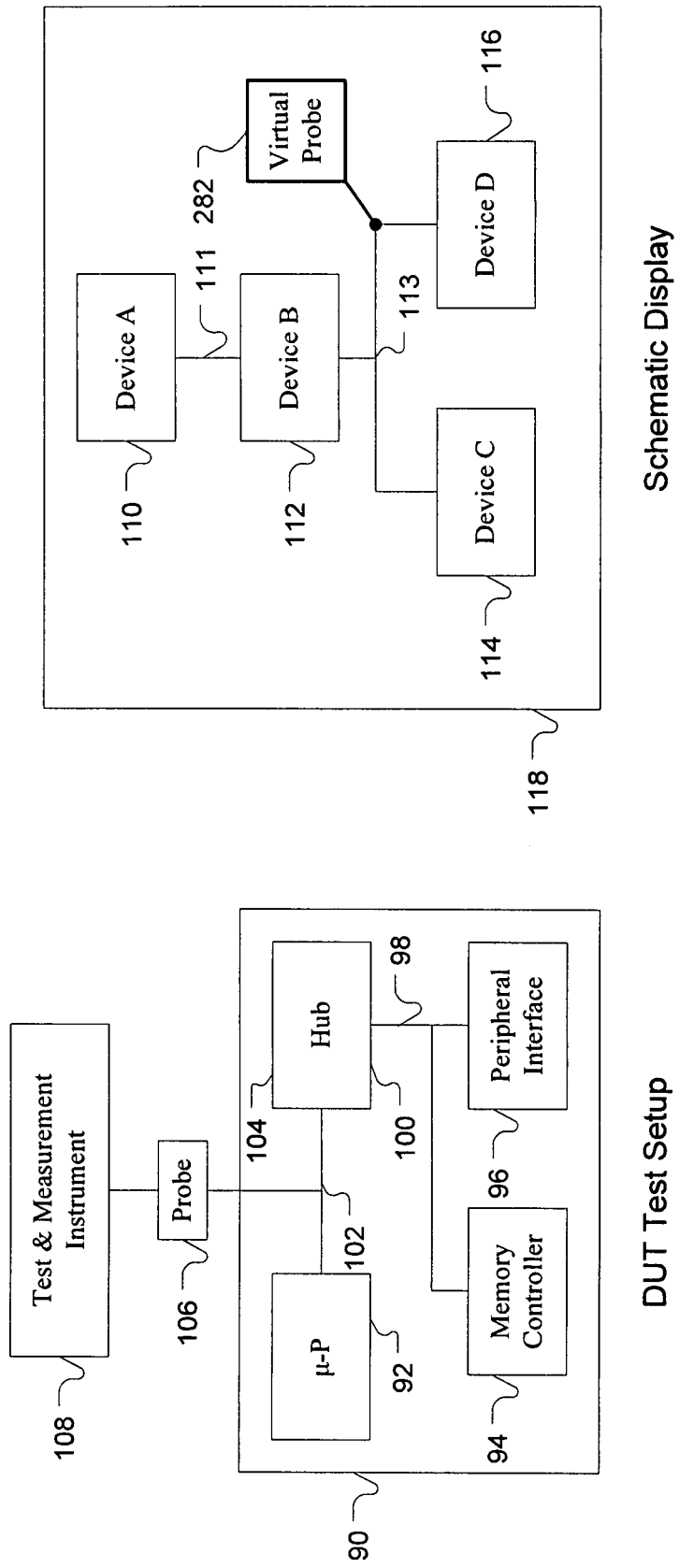
FIG. 14 is a block diagram illustrating virtual probing of schematic elements in a schematic display of FIG. 1.

FIG. 14 is a block diagram illustrating virtual probing of schematic elements in a schematic display of FIG. 1. As shown in the DUT test setup, the probe 106 is coupled to the DUT 90 at bus 102. Thus, the test and measurement instrument 108 can only capture data traveling across the bus 102. However, as described above, with such data, the test and measurement instrument 108 can still extract protocol-specific information from the data traveling across bus 102 sufficient to identify connection 113, device C 114, and device D 116 in the schematic display 118.

In identifying device D 116, for example, protocol-specific information has been extracted involving device D 116. Some of this protocol-specific information can be interpreted as passing through bus 98 and, consequently, the corresponding connection 113. In the schematic display, a user may place a virtual probe 282. The placement of the virtual probe 282 is an example of an interaction through the virtual probe interface 70.

In this example, the virtual probe 282 is placed on the connection 113 between device B 112 and device D 116. Thus, the selected schematic element input is the indication of the connection 113 for the virtual probe 282. Because protocol-specific information has been interpreted as traveling between device B 112 and device D 116, that information can be presented as if the user had probed the bus 98.

In one embodiment, the virtual probe interface 70 allows a user to probe a location on a schematic display as if the user had placed a probe on the actual DUT. The location of the virtual probe 282 is independent of the location of the physical probe 106. In addition to locations on the DUT where a physical probe 106 could have been placed, a user can use a virtual probe 282 to probe a location on the DUT where a physical probe 106 could not have been placed.

When the virtual probe 282 is placed in a location different from a physical probe 106, a different set of protocol-specific information can be presented. In this case, the different set can be the protocol-specific information that passes between device B 112 and device D 116. Thus, the user can isolate the protocol-specific information passing between device B 112 and device D 116 from the set of protocol-specific information collected by the probe 106. That is, the virtual probe 282 can be used as a filter to reduce the amount of information presented.

Although a user could have filtered the data captured by the probe 106 to isolate the data between device B 112 and device D 116, the user can place a virtual probe 282 on the schematic display and filter the data using the context of where the virtual probe 282 was placed. For example, when the virtual probe 282 is placed on the connection 113, the instrument can use the protocol-specific information related to the connection 113 to establish filter parameters. In this case, the filtering can select data related to communications between device B 112 and device D 116, while communications between device A 110 and device C 114 (and as a result even the existence of device C 114) can be deemphasized or eliminated from the schematic display. Such de-emphasis can be accomplished by a change in color, size, line weight, or the like. That is, the result of filtering can be de-emphasis.

In addition to the schematic display, a separate display of the protocol-specific information can be adjusted in response to the virtual probe interface 70. For example, a listing window, another schematic display, a box-car diagram, or any other type of display can be adjusted to present the different set of protocol-specific information described above.

Although a connection 113 has been described as a schematic element on which a virtual probe can be placed, any schematic element can be selected for a virtual probe. For example, device D 116 could be selected for the virtual probe. Thus, the device D 116 can be used as a parameter for filtering the data. Protocol-specific information or other data associated with device D 116, such as any data input to or output from device D 116, can be presented to the user.

As a result, the user can easily establish filtering parameters for interrogating the data. This ease of establishing filter criteria stems from the presentation of the protocol-specific information using schematic elements in a schematic display. The placement itself of the virtual probe 282 can define filter parameters relevant to the associated schematic element.

The virtual probe 282 can also be used as a trigger for the test and measurement instrument. Triggers can be associated with a stream of data accessed by a physical probe on a DUT. The trigger parameters can identify features of the data that will generate a trigger. These parameters are similar to filtering parameters in that both identify particular groupings of data that are of interest. With filtering, it is the identification of data to be presented. With triggering, it is the identification of data to cause some action or event, such as starting or stopping acquisition of data, Accordingly, a virtual probe 282 can be used to aid in defining trigger parameters. As described above, by placing the virtual probe 282 on the connection 113, the user indicates an interest in communications between device B 112 and device D 116. As a result, the user can, but need not specify the device identifications as trigger parameters explicitly. The device identification can be added to the trigger parameters based on the placement of the virtual probe 282 on the connection 113. Once the trigger parameters are established, a trigger generated using information related to a virtual probe can be used just as any other trigger.

As described above, the schematic display can be initialized in a variety of ways. When a user wants to place a virtual probe, there may not be schematic elements displayed on which to place the virtual probe. In such instances, an initialized schematic, such as initial schematic 222 of FIG. 10, can be used to provide schematic elements on which to place the virtual probe. The virtual probe can then be used as described above.

Although boxes, lines, groups of lines, or the like have been described above as schematic elements, schematic elements and the symbols forming the schematic elements can be selected as desired. For example, a bus could be represented by a line with a slash and a number indicating the number of lines in the bus. In another example, a network connecting multiple devices could be represented by a cloud. Furthermore, although standard illustration symbols can be used, the schematic elements are not limited to such symbols. In fact, in an embodiment, the focus is on the ease of interpretation of the underlying data by the user. Thus, any visual, auditory, or tactile elements that can easily convey the desired information to the user can be used.

Although a variety of controls, buttons, sliders, or the like have been described above in reference to various interfaces of a test and measurement instrument, such interfaces can be implemented in a variety of ways. For example, physical interfaces such as a mouse, a keyboard, a light pen, a joystick, a stylus, a button, a switch, a slider, or any other interface through which a user can provide input and/or receive information can be used. In addition, software implemented interfaces such as dialog boxes, radio buttons, soft-menu buttons, or the like can be used. Furthermore, combinations of such physical and software implemented interfaces can be used. For example, a stylus can be used to navigate through a series of soft-menus.

Figure 15:
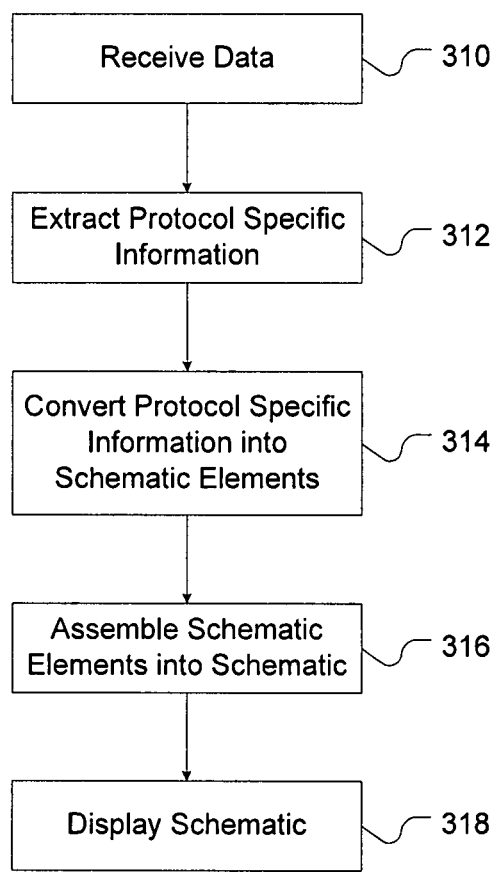
FIG. 15 is a flowchart showing a method of displaying data according to an embodiment of the invention.

FIG. 15 is a flowchart showing a method of displaying data according to an embodiment of the invention. In an embodiment, a method includes receiving data in 310, extracting protocol-specific information from the data in 312, converting the protocol-specific information into schematic elements in 314, assembling schematic elements into a schematic in 316, and displaying the schematic in 318.

Receiving the data in 310 may include receiving the data from a variety of sources. For example, a probe may receive signals from a DUT. The probe converts the signals into data. Alternatively, the data may be stored. Receiving the data may include reading the data from the file. Thus, receiving the data in 310 can include any variety of techniques for getting the data into a state to be further processed.

Extracting the protocol-specific information in 312 can be performed using a variety of techniques. Pattern-matching algorithms, data parsers, or the like may interpret the data to determine if the data corresponds to a particular protocol. If so, protocol-specific information is extracted by the algorithm or parser. For example, headers, flags, states, or the like may all be extracted as protocol-specific information.

Extracting the protocol-specific information in 312 can also include interpreting the data or the currently-extracted protocol-specific information to generate additional protocol-specific information. For example, if a first packet is received describing a request from a first device to a second device, yet a second packet with a response from the second device has not been received, the additional protocol-specific information that is extracted is the expectancy of the response in the second packet. As described above, the schematic elements for the second device can be selected to indicate the reduced certainty of the second device.

In another example, the second packet may not have been received in a time period defined by the protocol. Depending on the circumstances, the second packet may or may not have been received at all. Regardless, the time period for reception of the packet expired. From the time that passed from the receipt of the first packet and the protocol-defined time period, the unsuccessful reception of the second packet within the time period can become part of the protocol-specific information. As described above, this unsuccessful reception can be indicated by removing the schematic element or adjusting it to indicate the unsuccessful reception.

Thus, extracting the protocol-specific information in 312 is more than just the data within packets or other groupings according to the protocol. Extracting the protocol-specific information in 312 also includes information that is interpreted from the data itself. Accordingly, any definition, state, result, status, or the like defined by the protocol, regardless of whether it is explicitly present in the data, can become part of the protocol-specific information.

Converting the protocol-specific information into schematic elements in 314 includes extracting information that relates to schematic elements from the protocol-specific information. For example, a device ID in a packet of the protocol-specific information indicates that device. A packet sent from a first device to a second device not only identifies those devices, but also hints at the existence of the second device. A packet from the second device increases the certainty of the second device and can indicate other device specific information about the second device. A command within a packet sent to the second device for a memory read suggests that the second device may be a memory related device. A feature of these examples is that some information within the protocol-specific information relates to an object that could be placed on a schematic. That information is used to create, update, modify, destroy, or the like, any schematic element.

Although a vast amount of schematic-related protocol-specific information can exist in the protocol-specific information, all of it can, but need not be converted into schematic elements. For example, a user may want a certain level of information detail in the entire schematic display. As a result, schematic elements outside of the level of information detail need not be created.

Assembling schematic elements into a schematic in 316 can be performed in a variety of techniques. For example, assembling the schematic elements in 316 can be performed along with converting the protocol-specific information into schematic elements in 314. Thus, when a schematic element is converted from the protocol-specific information, it is assembled into the schematic.

In another example, assembling the schematic elements in 316 can be performed after converting the protocol-specific information into schematic elements in 314. This illustrates another use of schematic-related protocol-specific information. The schematic elements include relationships, such as connections, links, or the like, between devices, functions, or like. These relationships can be used to orient the schematic elements on the schematic.

In another example of assembling the schematic elements in 316, as described above, a template or initial schematic can be used. Schematic elements related to existing schematic elements in the template can update the existing schematic elements. Other schematic elements can be added using the existing elements as a guide for placement of the elements.

Figure 16:
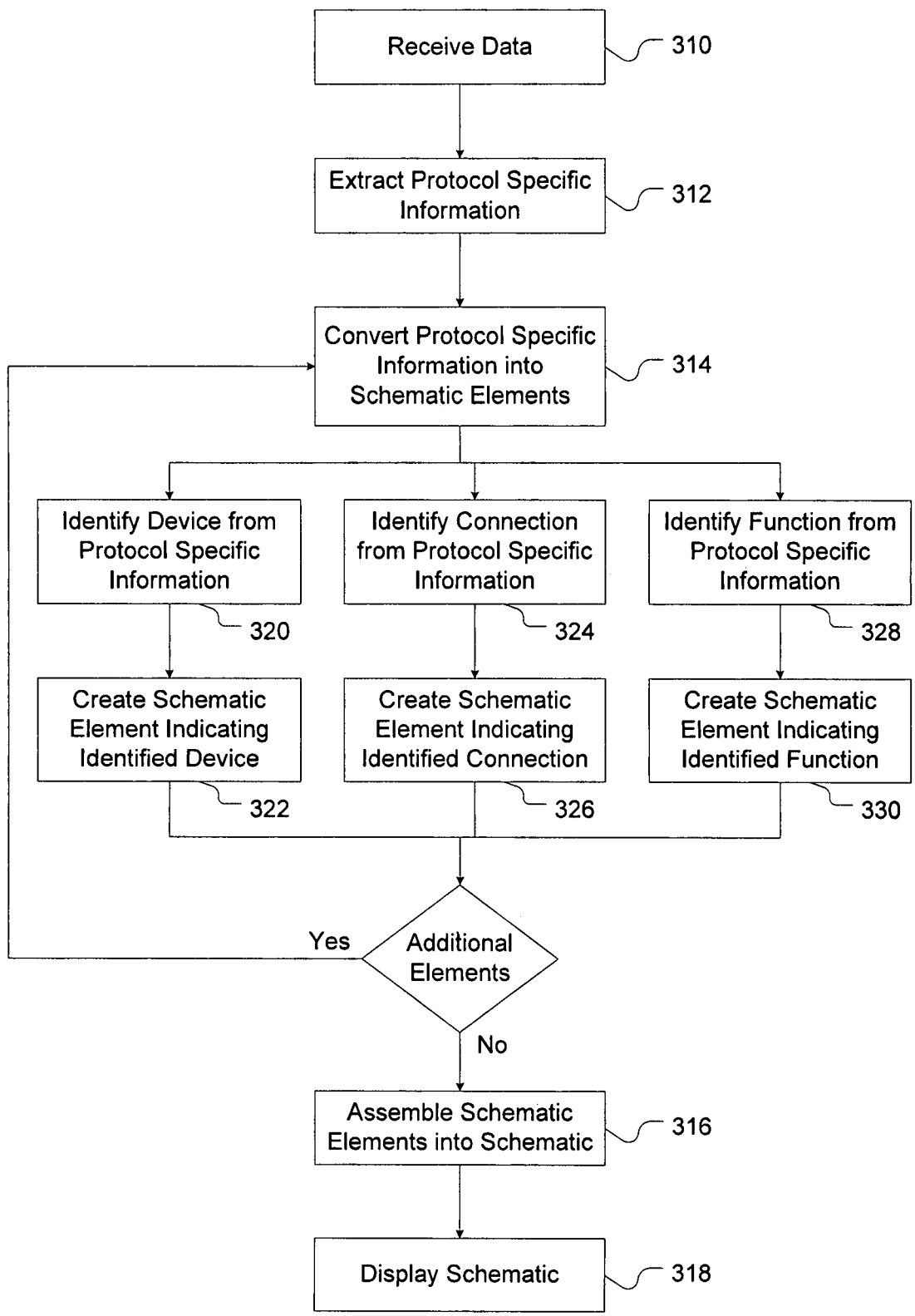
FIG. 16 is a flowchart showing examples of creating schematic elements from protocol-specific information in methods of displaying data in a schematic display.

FIG. 16 is a flowchart showing examples of creating schematic elements from protocol-specific information in methods of displaying data in a schematic display. In an embodiment, a method includes identifying a device from the protocol-specific information in 320, and creating a schematic element representing the device in response to the identified device 322.

In this embodiment, a device can correspond to an actual physical component or system in a DUT. For example, a device can be a hub for interfacing between a processor and peripheral devices. In another example, a device is a memory sub-system including both memory controllers and memory devices. Thus, a device can include one or more physical components.

In another embodiment, the method includes identifying a connection from the protocol-specific information in 324, and creating a schematic element representing the connection in response to the identified connection in 326. Similar to the devices described above, connections can be represented on a design schematic. Physical devices can be connected through connections such as transmission lines, communications links, or the like. Connections identified from the protocol-specific information include such connections between devices.

Furthermore, a connection can, but need not be a physical component. As described above, a channel or other conceptualization of communications in a DUT can link devices or functions together. A connection can represent such a communication.

In another embodiment, the method can include identifying a function from the protocol-specific information 328, and creating a schematic element representing the function in response to the identified function 330. A function can be more abstract than a physical device. For example, a function can be a process running on a device. In another example, a function can describe operation of multiple devices. Any conceptualization in processing can be described as a function. The function can be identified by examining protocol-specific information relating to the function. For example, a memory read operation can be a function.

The identification of devices, connections, functions, or the like are examples of converting protocol-specific information into schematic elements in 314. However, the conversion of protocol-specific information into schematic elements in 314 is not limited to these examples. In addition, these examples and other conversion techniques can be combined in any combination.

Figure 17:
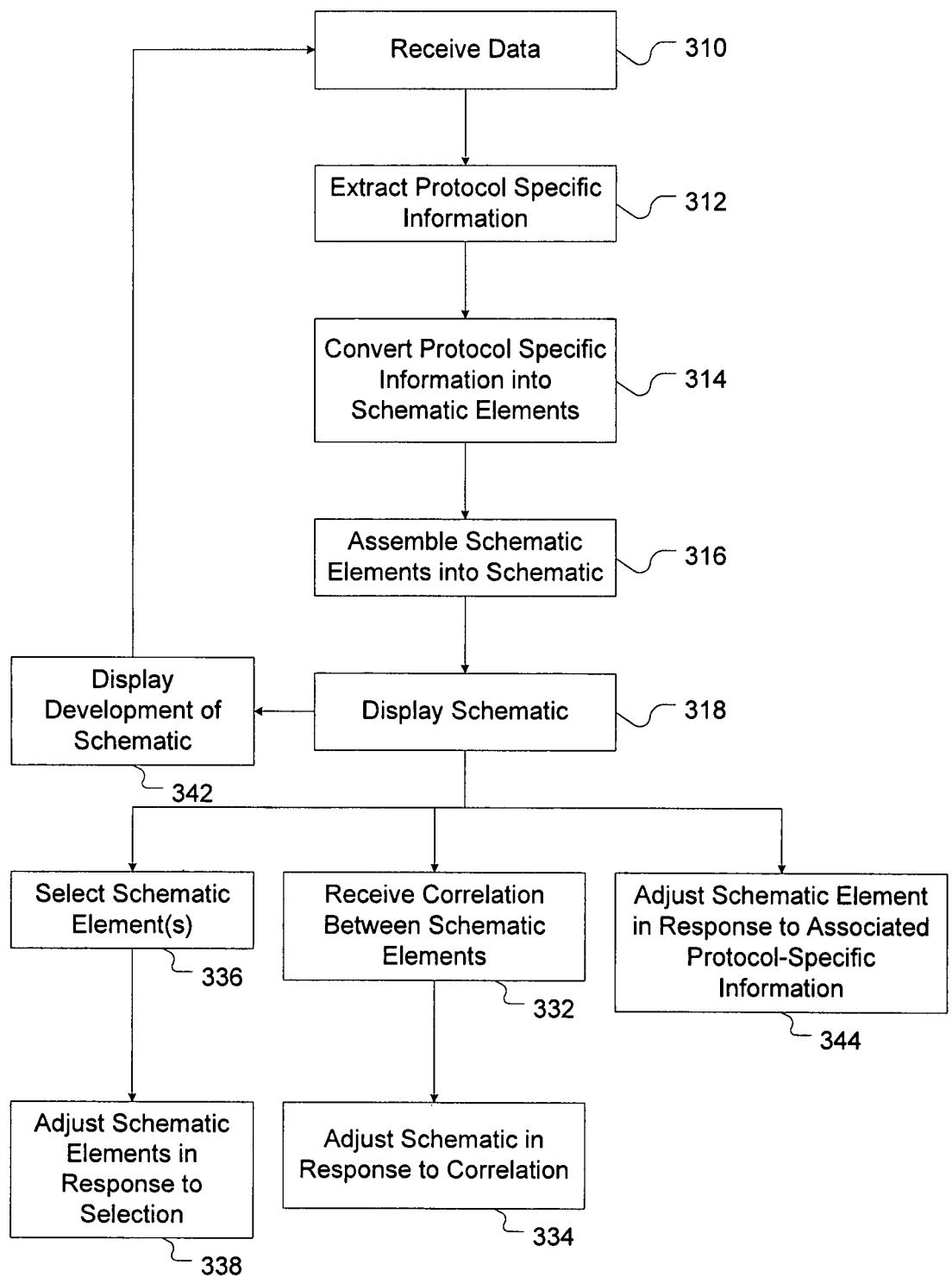
FIG. 17 is a flowchart showing methods of displaying data in a schematic display.

FIG. 17 is a flowchart showing methods of displaying data in a schematic display. In one embodiment, the method includes receiving a correlation among schematic elements in 332, and adjusting a schematic in response to the correlation in 334. As described above in reference to FIGS. 5 and 6, protocol-specific information from different sources can have different specifics concerning schematic elements. By receiving a correlation between schematic elements in 332, the protocol-specific information for each schematic element can be combined to create new information for both schematic elements. The schematic can be adjusted in response to this correlation.

In another embodiment, a method includes selecting a schematic element in the schematic in 336, and adjusting the schematic elements in response to the selection 338. As described above, selection of a schematic element can have a variety of results. For example, related schematic elements can be highlighted. Related data in other presentation formats can be identified. A level of information detail for the schematic element can be changed. Anything related to that schematic element can be adjusted.

In another embodiment, a method includes displaying development of the schematic over time in response to the protocol-specific information in 342. As described above, additional data can be received over time. As a result, the additional data can result in additional protocol-specific information. As new data is received, new protocol-specific information can be extracted. This can lead to new schematic elements. Furthermore, the additional time and a lack of protocol-specific information regarding existing schematic elements can lead to an indication of reduced certainty for those schematic elements. As a result, the schematic develops over time in response to the additional protocol-specific information. The development of the schematic is the change or other transformation of the schematic. Although development has been described as a change, development can also include no change. In an embodiment, displaying the development of the schematic over time can include displaying the development of the schematic backwards in time.

By observing the development of the schematic, a user receives an image in schematic form of the DUT. For example, if a new device is connected to the DUT, over time, the new device is gradually filled in with more detail. Similarly, if a device is removed, the schematic elements for that device can gradually fade away. In another example, a user can notice a newly formed device, and then examine the development of the schematic backwards in time to investigate its formation.

In another example, a device that has intermittent connections, the user will see the device changing in the schematic. Thus, the intermittent connection that could result in an error will be apparent to the user.

In one embodiment, displaying the development of the schematic includes extracting the additional protocol-specific information from the data, updating the schematic elements with the additional protocol-specific information, updating the schematic with the updated schematic elements, and displaying the updated schematic.

In another embodiment, a method includes adjusting a schematic element in response to protocol-specific information associated with the schematic element in 344. An example of adjusting the schematic element includes adjusting the schematic element in response to protocol-specific information associated with the schematic element to indicate an accuracy of the schematic element. As described above, as more protocol-specific information is extracted, more or less certainty of a schematic element is obtained. This certainty can be expressed as an accuracy of the schematic element. For example, if little is known about a schematic element or the information known is out of date, the information known about the schematic element may not be accurate. Thus, it can be displayed with an attribute representing the reduced accuracy. In contrast, if recent information in sufficient amount is available for a schematic element, it can be displayed as having an increased certainty.

The accuracy can, but need not be just a change in presentation of the schematic element. For example, a schematic element representing a device can also indicate functions, connections, or the like within the device. Such additions to a schematic element represent an increased accuracy. In contrast, the functions and connections may fade over time without affecting the base schematic element for the device. This fading can represent a reduced certainty. The device can still be known, however, it is not certain whether the functions or connections still exist.

Figure 18:
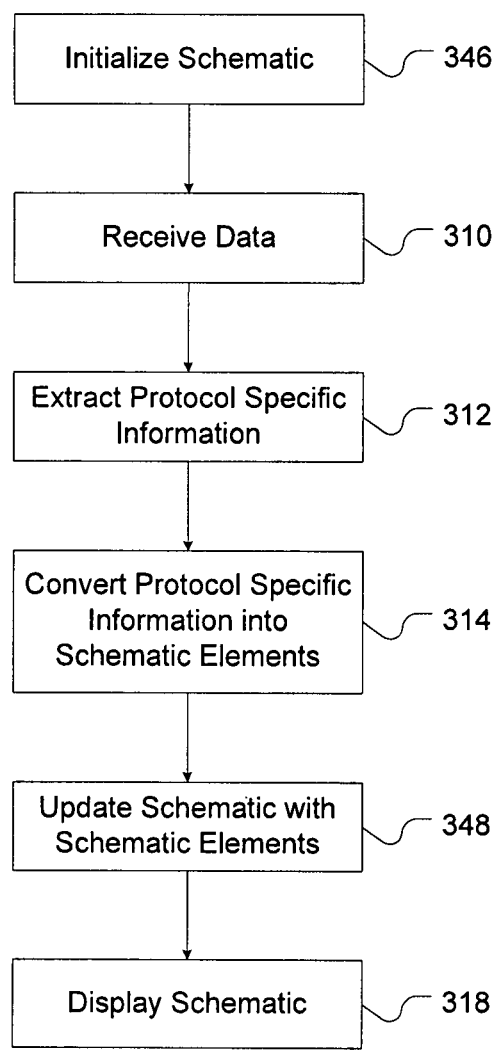
FIG. 18 is a flowchart showing initializing and updating a schematic in a method of displaying data in a schematic display.

FIG. 18 is a flowchart showing initializing and updating a schematic in a method of displaying data in a schematic display. In an embodiment, a method includes initializing the schematic with a previously assembled schematic in 346, and updating the schematic with the schematic elements in 348. As described above, a schematic can be initialized. The initialization can be from a template, another schematic, a set of data, a set of protocol-specific information, or the like. Anything that has information relating to schematic elements can be used to initialize a schematic.

After the schematic is initialized, data is received, and protocol-specific information is extracted and converted into schematic elements. Using these new schematic elements, existing schematic elements in the initial schematic can be updated.

Figure 19:
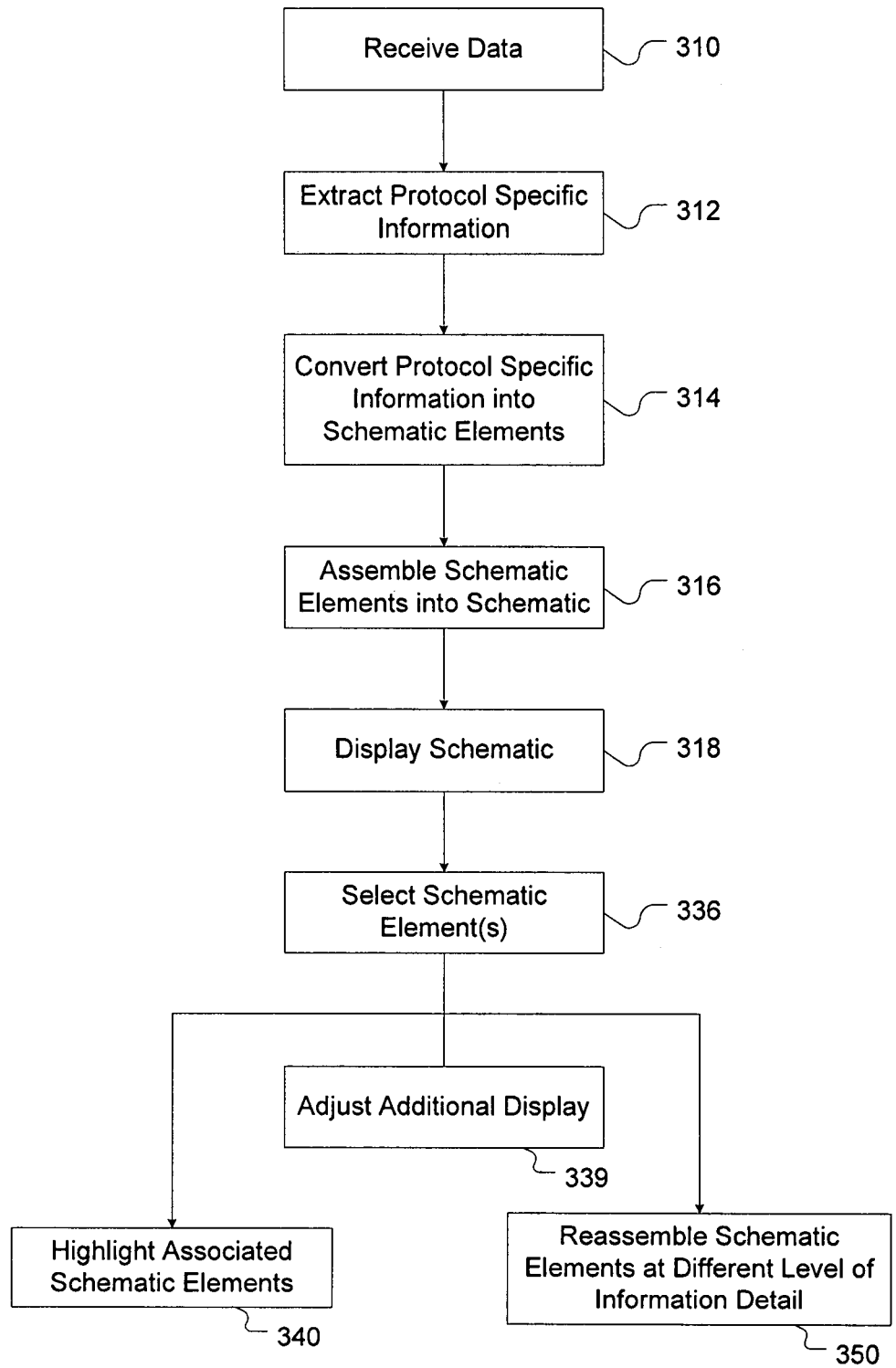
FIG. 19 is a flowchart showing selecting schematic elements in a schematic display in a method of displaying data in a schematic display.

FIG. 19 is a flowchart showing selecting schematic elements in a method of displaying data in a schematic display. In an embodiment, a method includes selecting a schematic element in the schematic in 336, and highlighting schematic elements associated with the selected schematic element in 340. Such selecting in 336 can be performed by a user, an automated process, a combination of such techniques, or the like. Thus, with a selection, a user can see how a particular schematic element affects the rest of the DUT. For example, connections carrying information associated with the selected schematic element can be highlighted. Alternatively, if the selected schematic element is a connection, related devices and functions can be highlighted.

In another embodiment, a method includes selecting a schematic element in the schematic in 336, and reassembling the schematic elements into the schematic such that schematic elements associated with the selected schematic element are illustrated at a different level of information detail 350. Thus, the level of information detail of a schematic element can be changed. For example, a selected element can be expanded as with device A 262 in FIG. 13. In another example, non-selected elements can be contracted or remain the same as with device B 266 of FIG. 13.

In addition, related annotations or modifications to the schematic element can be reflected in the new level of information detail. For example, a schematic element can be colored red, indicating an error associated with the schematic element. If the level of information detail is increased, the error can be indicated with more specificity. A particular function within a device could be causing the error. When that device's schematic element is expanded, the error indication transfers to the function. Thus, the user can follow the error from a broad overview indicating the error at the device level, to a higher degree of specificity, indicating the error at the function level internal to the device.

In another embodiment, a method includes adjusting an additional display of the data in response to the selection in 339. As described above, in FIG. 7, a listing window 168 is adjusted in response to the selection of connection 180. The listing window 168 is an example of an additional display of the data. Other examples include statistical displays, other schematic displays, other symbolic displays, or any other display of the data.

The adjusting of the additional display in 339 can be any kind of change. As described above, elements of displays can be highlighted, annotated, moved, reorganized, resized, or otherwise manipulated. In an embodiment, such a change indicates the association of the schematic element selected in 336 and the adjusted elements of the additional display.

Figure 20:
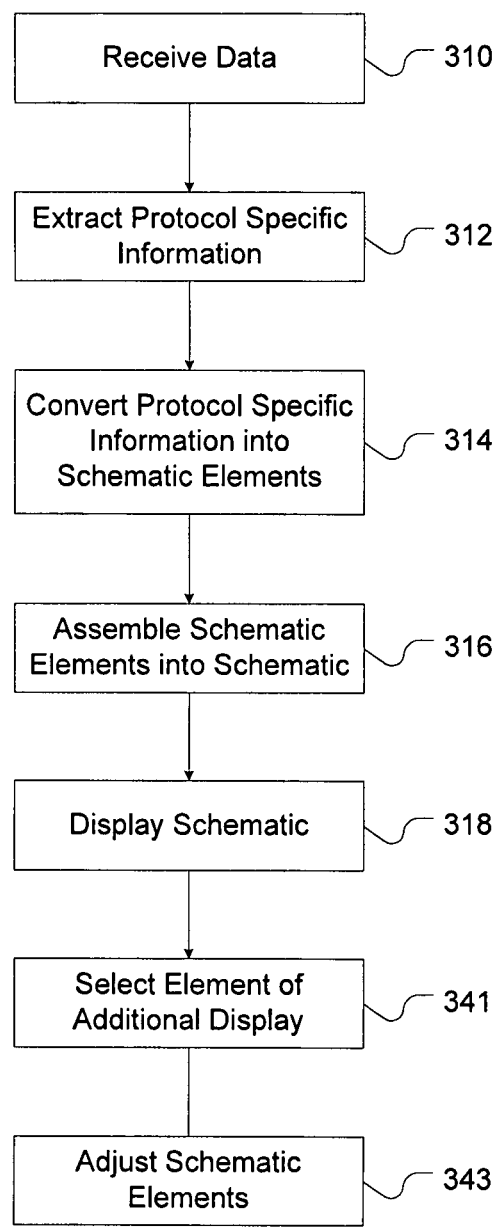
FIG. 20 is a flowchart showing selecting elements in an additional display of the data in a method of displaying data in a schematic display.

FIG. 20 is a flowchart showing selecting elements in an additional display of the data in a method of displaying data in a schematic display. As described above, an additional display can be adjusted in response to a selection of a schematic element. Similarly, a schematic display can be adjusted in response to a selection in an additional display.

In an embodiment, a method includes selecting an element of an additional display of the data in 341, and adjusting the schematic elements in response to the selection in 343. As described above, the additional display can be any kind of display of the data. The selection of an element of the additional display in 341 can be any selection appropriate for the particular type of display. For example, if the additional display is a symbolic display, the selection can be of symbol or set of symbols. If the additional display is a listing display, the selection can be of an entry or set of entries.

The adjusting of the schematic elements in response to the selection in 343 can be any kind of adjusting. For example, a variety of techniques for adjusting a schematic displayer are described above. Any such techniques can be used to adjust the schematic elements in 343. As a result, a user can manipulate an additional display of the data, including displays such as the box car display described above, and the schematic display can be adjusted to focus the user's attention on schematic elements related to the selection in the additional display.

Figure 21:
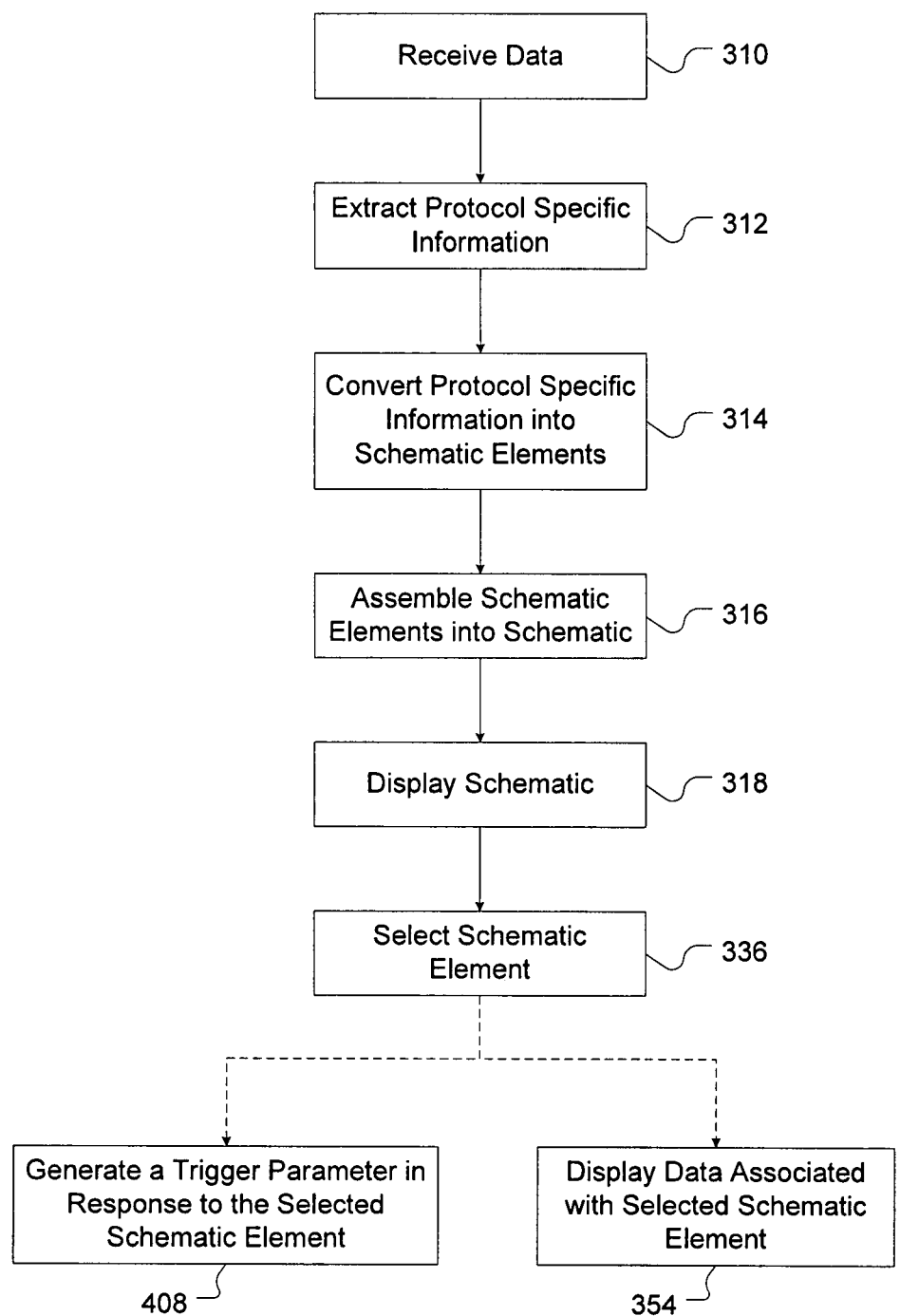
FIG. 21 is a flowchart showing displaying data and generating a trigger using a selected schematic element of a schematic display in a method of displaying data.

FIG. 21 is a flowchart showing displaying data and generating a trigger using a selected schematic element in a method of displaying data in a schematic display. In an embodiment, a method includes selecting a schematic element in the schematic in 336, and displaying data associated with the selected schematic element in 354. In an example of displaying the data associated with the selected schematic element in 354, attributes of the selected schematic element can be used to filter the display of the data. In particular the filtered display can be an additional or different display of the data. Thus, the selection of a schematic element can be used to focus an interrogation of the data to data related to the schematic element. For example, if a connection 113 as described above is selected, a display of the data can be filtered such that only data interpreted as passing over that connection 113 is displayed. Any attributes of the selected schematic element, related protocol-specific information, or the like can be used in the displaying of the data in 354.

In another example, a method includes selecting a schematic element in the schematic in 336, and generating a trigger parameter in response to the selected schematic element 408. As described above, triggering has similarities with filtering a display of data. Both involve examining data for matches for particular criteria. Triggering causes some action or event to occur in response to a match. By selecting a schematic element for use with a trigger, the user indicates that a trigger parameter includes something related to the selected schematic element. For example, a device identification of a selected schematic element representing a device can be used to generate a trigger parameter indicating that device. Thus, an action can be taken when data associated with that device is received.

The trigger parameter generated in response to the selected schematic element can, but need not be the only trigger parameter used to define a trigger. Other parameters from other sources, default parameters, or the like can also be used with the trigger parameter generated from the selected schematic element. Furthermore, more than one trigger parameter can be generated from the selected schematic element. As described above, protocol-specific information such as device identifications can be used as trigger parameters. Other examples include states of a connection, types of data, or the like. Any class, grouping, organization, or the like of protocol-specific information can be used as a trigger parameter.

As described above the selection a schematic element need not be limited to one schematic element. For example, a user can select multiple devices on the schematic. Then, a display of data can be presented or trigger parameters can be generated in response to the multiple selected devices. Furthermore, although a connection has been used as an example of a selected schematic element, any type of schematic element can be selected. For example, a device can be selected to use the protocol-specific information associated with that device. In addition, the selected schematic element need not correspond to a physical element. As described above, conceptual elements such as a connection mapping can be illustrated as schematic elements. The connection mapping can be selected for displaying the data passing through the connection mapping or generating a trigger parameter based on a parameter of the connection mapping.

FIG. 22 is a flowchart showing annotation of schematic elements in a method of displaying data in a schematic display. In another embodiment, a method includes annotating a schematic element in response to the protocol-specific information in 400. Some protocol-specific information may not be easily represented by a schematic element, if at all. Annotating includes the addition of symbols of the schematic elements, or the modification of symbols of the schematic elements.

In another embodiment, a method includes annotating a schematic element to indicate process flow in 402. Since data can be acquired over time, the schematic can be updated over time. Process flow can be illustrated on the schematic. Process flow is the movement of data, communications, states, or the like of and between the schematic elements. For example, a packet sent from one device to another device can be illustrated by annotating a connection to represent the movement of the packet. A moving pulse could represent the packet. Thus, the user is notified of both the location of the packet and its direction.

In another example, a communication can travel from a first device, be repeated by a second device, and terminate at a third device. Thus, over the communications between the first and second devices and between the second and third devices, the communication can be illustrated. As a result, a user can see the propagation of communications. In one example, if there is an error in the second device, the user will see the communication traveling to the second device. However, the user will not see the communication traveling from the second device to the third device. Thus, by visual inspection, the user has an understanding of a device involved with the failed communication.

In another embodiment, a method includes annotating a schematic element in response to data-independent information in 404. Data-independent information includes information that was not included or extractable from the data. For example, correlations of device ID numbers to manufacturers and part numbers can be used to annotate a device with such information. In another example, physical device location from design documents such as schematic and layout files can be used to annotate schematic elements. In this example, annotation can mean the placement of the schematic element in the schematic.

Furthermore, data-independent information is not limited to information that cannot be represented as protocol-specific information or any particular type of information. The scope of data-independent information can vary from data set to data set. For example, one data set may not have device manufacturer information. Thus, the device manufacturer information could be data-independent information. Another set of data may have the device manufacturer information. In this set, the device manufacturer information would not be data-independent information.

Although processes in methods have been described above in particular sequences, the processes can be ordered in a variety of sequences in other embodiment. Furthermore, such processes can also be combined together, whether in serial or in parallel in other embodiments.

In an embodiment, a test and measurement instrument for displaying data, includes means for receiving data, means for extracting protocol-specific information from the data, means for converting the protocol-specific information into schematic elements, means for assembling schematic elements into a schematic, and means for displaying the schematic.

Another embodiment of a test and measurement instrument includes means for identifying a device from the protocol-specific information, and means for creating a schematic element representing the device in response to the identified device.

Another embodiment of a test and measurement instrument includes means for selecting a schematic element in the schematic, and means for adjusting the schematic elements in response to the selection.

Another embodiment of a test and measurement instrument includes means for displaying development of the schematic.

Another embodiment of a test and measurement instrument includes means for adjusting a schematic element in response to protocol-specific information associated with the schematic element.

As described above, various combinations of acquisition systems, processors, and displays can form a test and measurement instrument. The means recited above include such combinations. Any of the above recited methods may be implemented in a test and measurement instrument through means for performing the methods such as those combinations described above.

Another embodiment includes an article of machine readable code embodied on a machine readable medium that when executed, causes the machine to perform any of the above described operations. As used here, a machine is any device that can execute code. Microprocessors, programmable logic devices, multiprocessor systems, digital signal processors, personal computers, or the like are all examples of such a machine.

Although particular embodiments have been described, it will be appreciated that the principles of the invention are not limited to those embodiments. Variations and modifications may be made without departing from the principles of the invention as set forth in the following claims.

The invention claimed is:

1. A method for use in a protocol analyzer, of displaying data, the data representing a schematic of a system under test, said system using communications among components of said system, comprising the steps of:
   acquiring the data from the system;
   extracting protocol-specific information from the data;
   analyzing said extracted protocol-specific information to detect errors;
   converting the protocol-specific information into schematic elements, the schematic elements being selected from the group consisting of devices, functions, operations, connections, and links;
   generating from the schematic elements a symbolic representation of the system in the form of said schematic;
   annotating said symbolic representations to indicate an occurrence of one of said errors; and
   displaying the schematic on a display screen of the protocol analyzer.

2. The method of claim 1, further comprising:
   receiving a correlation among schematic elements; and
   adjusting the schematic in response to the correlation.

3. The method of claim 1, further comprising:
   selecting one of the schematic elements in the schematic; and
   adjusting others of the schematic elements associated with the selected one of the schematic elements.

4. The method of claim 3, wherein selecting one of the schematic elements includes at least one of:
   selecting the schematic element in response to a user input; and
   selecting the schematic element in response to an automated process.

5. The method of claim 1, further comprising:
   selecting one of the schematic elements in the schematic; and
   adjusting an additional display of the data in response to the selected one of the schematic elements.

6. The method of claim 1, further comprising:
selecting an element of an additional display of the data; and
adjusting the schematic elements in response to the selection.

7. The method of claim 1, further comprising:
displaying development of the schematic over time in response to the protocol-specific information.

8. The method of claim 7, further comprising adjusting the development of the schematic in response to at least one of a user input and an automated process.

9. The method of claim 7, further comprising:
extracting additional protocol-specific information from the data;
updating the schematic elements with the additional protocol-specific information;
updating the schematic with the updated schematic elements; and
displaying the updated schematic.

10. The method of claim 1, further comprising:
adjusting one of the schematic elements in response to the protocol-specific information associated with the one schematic element.

11. The method of claim 10, further comprising:
adjusting the one schematic element to indicate an accuracy of the one schematic element.

12. The method of claim 1, further comprising:
annotating one or more of the schematic elements in response to the protocol-specific information;
wherein annotating the schematic elements includes annotating the schematic elements to indicate process flow.

13. The method of claim 1, further comprising:
initializing the schematic with a previously assembled schematic; and
updating the schematic with the schematic elements.

14. The method of claim 1, further comprising:
selecting one of the schematic elements in the schematic; and
highlighting other schematic elements associated with the selected schematic element.

15. The method of claim 1, further comprising:
selecting one of the schematic elements in the schematic; and
reassembling the schematic elements into the schematic such that schematic elements associated with the selected schematic element are illustrated at a different level of information detail.

16. The method of claim 1, further comprising:
selecting one of the schematic elements in the schematic; and
displaying data associated with the selected schematic element.

17. The method of claim 16, further comprising:
removing data not associated with the selected schematic element.

18. The method of claim 1, further comprising:
selecting one of the schematic elements in the schematic; and
generating a trigger parameter in response to the selected schematic element.

19. The method of claim 1, wherein displaying the schematic includes at least one of:
visually presenting the schematic;
aurally presenting the schematic; and
tactilely presenting the schematic.

20. A test and measurement instrument for displaying data, the data representing a system of the type using communications among components of the system, comprising:
an acquisition system configured to receive an input signal to convert it into the data;
a processor coupled to the acquisition system and configured to extract protocol-specific information from the data, to convert the protocol-specific information into schematic elements, the schematic elements being selected from the group consisting of devices, functions, operations connections, and links, and to generate a symbolic representation in the form of a schematic for the system from the schematic elements;
said processor analyzing said extracted protocol-specific information to detect errors;
said processor annotating said symbolic representations to indicate an occurrence of one of said errors; and
a display coupled to the processor and configure to display the schematic.

21. The test and measurement instrument of claim 20, further comprising:
a schematic element manipulation interface configured to receive a selected one of the schematic elements as an input;
wherein the processor is further configured to adjust schematic elements associated with the selected schematic element in the schematic.

22. The test and measurement instrument of claim 20, further comprising:
a virtual probe interface configured to receive a selected schematic element input corresponding to a selected one of the schematic elements;
wherein the processor is further configured to display protocol-specific information associated with the selected schematic element.

23. The test and measurement instrument of claim 20, further comprising:
a correlation interface configured to receive a correlation input identifying a first schematic element and a second schematic element of the schematic;
wherein the processor is further configured to adjust the schematic such that the first and second schematic elements are correlated in the schematic.

24. The test and measurement instrument of claim 20, further comprising:
a schematic animation interface configured to control an animation position;
wherein the processor is further configured to adjust the schematic in response to a change in the animation position.

25. The test and measurement instrument of claim 20, further comprising:
a semantic zoom interface configured to control a semantic zoom level;
wherein the processor is further configured to adjust a level of information detail in the schematic in response to the semantic zoom interface.

26. A test and measurement instrument for displaying data, the data rep resenting a system of the type using communications among components of the system, comprising:
means for receiving the data;
means for extracting protocol-specific information from the data;
means for converting the protocol-specific information into schematic elements, the schematic elements being selected from the group consisting of devices, functions, operations, connections, and links;

means for assembling the schematic element into a schematic for the system; and means for displaying the schematic.

27. The test and measurement instrument of claim 26, further comprising:

means for selecting one of the schematic elements in the schematic; and means for adjusting the schematic elements associated with the selected schematic element.

28. The test and measurement instrument of claim 26, further comprising:

means for displaying development of the schematic.

29. The test and measurement instrument of claim 26, further comprising:

means for adjusting one of the schematic elements in response to protocol-specific information associated with the one schematic element.

* * * * *